US011937106B2

(12) United States Patent
Ryu et al.

(10) Patent No.: US 11,937,106 B2
(45) Date of Patent: Mar. 19, 2024

(54) CRS RATE MATCHING REQUEST IN DSS

(71) Applicant: QUALCOMM Incorporated, San Diego, CA (US)

(72) Inventors: Jae Ho Ryu, San Diego, CA (US); Hari Sankar, San Diego, CA (US); Alexei Yurievitch Gorokhov, San Diego, CA (US); Hobin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 17/409,709

(22) Filed: Aug. 23, 2021

(65) Prior Publication Data

US 2023/0055870 A1 Feb. 23, 2023

(51) Int. Cl.
*H04W 24/08* (2009.01)
*H04L 1/00* (2006.01)
(Continued)

(52) U.S. Cl.
CPC ........... *H04W 24/08* (2013.01); *H04L 1/0013* (2013.01); *H04L 5/0048* (2013.01); *H04W 72/23* (2023.01); *H04L 1/0025* (2013.01)

(58) Field of Classification Search
CPC .... H04J 11/005; H04L 1/0013; H04L 1/0025; H04L 5/0048; H04W 24/08; H04W 72/23
See application file for complete search history.

(56) References Cited

U.S. PATENT DOCUMENTS 9,621,308 B2 * 4/2017 Krishnamurthy ...... H04B 17/24
2014/0036849 A1 * 2/2014 Ribeiro ................. H04L 5/0035
370/329

(Continued)

FOREIGN PATENT DOCUMENTS

WO WO-2022162624 A1 * 8/2022
WO WO-2022257576 A1 * 12/2022

OTHER PUBLICATIONS

MediaTek Inc., "Discussion on DSS for LTE CRS interference handling", 3GPP TSG RAN#91E, RP-210646, Mar. 2021, Agenda Item 9.7.17, Total pp. 8 (Year: 2021).*

(Continued)

*Primary Examiner* — Shah M Rahman
(74) *Attorney, Agent, or Firm* — Procopio, Cory, Hargreaves & Savitch

(57) ABSTRACT

The present disclosure relates to methods and devices for wireless communication including an apparatus, e.g., a UE and/or a base station. The apparatus may measure a RSRP of a CRS for each of a plurality of neighboring cells. The apparatus may also calculate an interference strength of each of the plurality of neighboring cells based on the RSRP measurement of the CRS for each of the plurality of neighboring cells. Additionally, the apparatus may compare a PDSCH demodulation performance of the UE based on rate matching for a CRS offset associated with each of the plurality of neighboring cells with the PDSCH demodulation performance of the UE based on skipping the rate matching for the CRS offset. The apparatus may also transmit a request for the rate matching or skipping the rate matching for the CRS offset based on the comparison of the PDSCH demodulation performance of the UE.

30 Claims, 13 Drawing Sheets

(51) Int. Cl.
*H04L 5/00* (2006.01)
*H04W 72/23* (2023.01)

(56) References Cited

U.S. PATENT DOCUMENTS

| | | | | |
|---|---|---|---|---|
| 2014/0078976 | A1* | 3/2014 | Novak | H04L 5/0058 370/329 |
| 2014/0269597 | A1* | 9/2014 | Park | H04W 52/262 370/329 |
| 2014/0301303 | A1* | 10/2014 | Roman | H04L 5/0073 370/329 |
| 2014/0321370 | A1* | 10/2014 | Chen | H04L 1/0038 370/329 |
| 2015/0103683 | A1* | 4/2015 | Kim | H04J 11/0059 370/252 |
| 2015/0195068 | A1* | 7/2015 | Kim | H04L 5/0048 370/329 |
| 2015/0207601 | A1* | 7/2015 | Kim | H04L 5/0073 370/329 |
| 2015/0208265 | A1* | 7/2015 | Dalsgaard | H04L 5/0048 370/252 |
| 2015/0223254 | A1* | 8/2015 | Guo | H04W 72/53 370/312 |
| 2017/0332357 | A1* | 11/2017 | Xu | H04W 72/0453 |
| 2018/0279272 | A1* | 9/2018 | Bhattad | H04W 24/08 |
| 2018/0279330 | A1* | 9/2018 | Hong | H04W 72/23 |
| 2018/0324678 | A1* | 11/2018 | Chen | H04W 56/001 |
| 2019/0268792 | A1* | 8/2019 | Marinier | H04L 5/0053 |
| 2019/0306775 | A1* | 10/2019 | Duan | H04L 5/0051 |
| 2019/0387533 | A1* | 12/2019 | Papasakellariou | H04W 56/00 |
| 2020/0275522 | A1* | 8/2020 | Chervyakov | H04W 76/28 |
| 2021/0266095 | A1* | 8/2021 | Kumar | H04L 1/0067 |
| 2022/0021482 | A1* | 1/2022 | Wang | H04W 72/0453 |
| 2022/0116180 | A1* | 4/2022 | Liu | H04L 5/0051 |
| 2022/0183015 | A1* | 6/2022 | Jang | H04W 72/541 |
| 2022/0312452 | A1* | 9/2022 | Frenne | H04W 72/1273 |
| 2022/0322130 | A1* | 10/2022 | Muruganathan | H04W 16/14 |
| 2022/0345240 | A1* | 10/2022 | Chen | H04L 1/0002 |
| 2022/0360998 | A1* | 11/2022 | Park | H04L 5/005 |
| 2022/0394743 | A1* | 12/2022 | Park | H04L 1/0067 |
| 2023/0081776 | A1* | 3/2023 | Kim | H04L 5/0051 370/329 |
| 2023/0171611 | A1* | 6/2023 | Matsumura | H04B 7/088 370/329 |

OTHER PUBLICATIONS

Intel Corporation, "Views on CRS-IM for LTE/NR co-existence scenarios", 3GPP TSG-RAN Meeting #91-e, RP-210680, E-meeting, Dec. 22-26, 2020, Agenda item: 9.7.17, Total pp. 5 (Year: 2020).*

Atawia et al., "Enhanced Fast CRS Rate Matching Selection in DSS", U.S. Appl. No. 63/143,168, filed Jan. 29, 2021, Total pp. 49 (Year: 2021).*

Park et al., "A Basestation Supporting Dynamic Spectrum Sharing Between Heterogeneous Networks and Wireless Communication System Including the Same", Republic of Korea Pattent Application KR 10-2021-0100136, Jul. 29, 2021, Total pp. 62 (Year: 2021).*

* cited by examiner

CRS RATE MATCHING REQUEST IN DSS

TECHNICAL FIELD

The present disclosure relates generally to communication systems, and more particularly, to rate matching in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, a configuration for a reference signal received power (RSRP) measurement of a cell-specific reference signal (CRS) for each of a plurality of neighboring cells. The apparatus may also measure a reference signal received power (RSRP) of a cell-specific reference signal (CRS) for each of a plurality of neighboring cells. Additionally, the apparatus may calculate an interference strength of each of the plurality of neighboring cells based on the RSRP measurement of the CRS for each of the plurality of neighboring cells. The apparatus may also compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells. Further, the apparatus may determine whether to request the rate matching or skipping the rate matching for the CRS offset associated with each of the plurality of neighboring cells based on the comparison of the PDSCH demodulation performance of the UE, where the request is transmitted based on the determination. The apparatus may also transmit, to a base station, a request for the rate matching or skipping the rate matching for the CRS offset associated with each of the plurality of neighboring cells based on the comparison of the PDSCH demodulation performance of the UE. The apparatus may also receive, from the base station based on the transmitted request, an indication of the rate matching or skipping the rate matching for the CRS offset associated with each of the plurality of neighboring cells.

In another aspect of the disclosure, a method, a computer-readable medium, and an apparatus are provided. The apparatus may be a base station. The apparatus may transmit, to a user equipment (UE), a configuration for a reference signal received power (RSRP) measurement of a cell-specific reference signal (CRS) for each of a plurality of neighboring cells. The apparatus may also receive, from a user equipment (UE), a request for rate matching or skipping rate matching for a cell-specific reference signal (CRS) offset associated with each of a plurality of neighboring cells based on a physical downlink shared channel (PDSCH) demodulation performance of the UE. The apparatus may also initiate a timer when the request for the rate matching or skipping the rate matching is received, where the rate matching or skipping the rate matching is applied once the timer is initiated. Moreover, the apparatus may apply, based on the received request, the rate matching or skipping the rate matching for the CRS offset associated with each of the plurality of neighboring cells. The apparatus may also stop applying the rate matching or skipping the rate matching when the timer expires. The apparatus may also transmit, to the UE, an indication of the rate matching or skipping the rate matching for the at the CRS offset associated with each of the plurality of neighboring cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
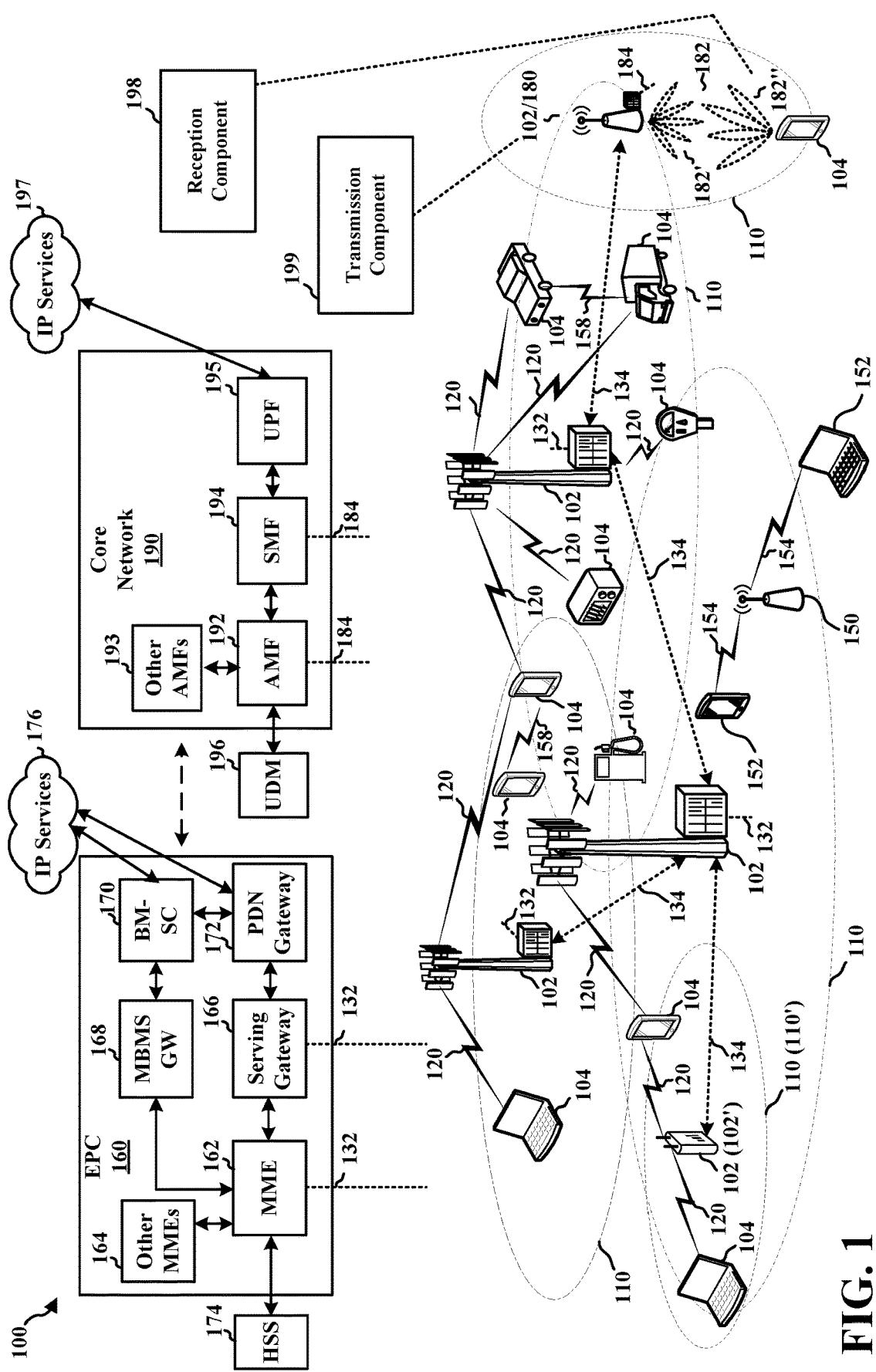
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to receive, from a base station, a configuration for a reference signal received power (RSRP) measurement of a cell-specific reference signal (CRS) for each of a plurality of neighboring cells. Reception component 198 may also be configured to measure a reference signal received power (RSRP) of a cell-specific reference signal (CRS) for each of a plurality of neighboring cells. Reception component 198 may also be configured to calculate an interference strength of each of the plurality of neighboring cells based on the RSRP measurement of the CRS for each of the plurality of neighboring cells. Reception component 198 may also be configured to compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells. Reception component 198 may also be configured to determine whether to request the rate matching or skipping the rate matching for the CRS offset associated with each of the plurality of neighboring cells based on the comparison of the PDSCH demodulation performance of the UE, where the request is transmitted based on the determination. Reception component 198 may also be configured to transmit, to a base station, a request for the rate matching or skipping the rate matching for the CRS offset associated with each of the plurality of neighboring cells based on the comparison of the PDSCH demodulation performance of the UE. Reception component 198 may also be configured to receive, from the base station based on the transmitted request, an indication of the rate matching or skipping the rate matching for the CRS offset associated with each of the plurality of neighboring cells.

Referring again to FIG. 1, in certain aspects, the base station 180 may include a transmission component 199 configured to transmit, to a user equipment (UE), a configuration for a reference signal received power (RSRP) measurement of a cell-specific reference signal (CRS) for each of a plurality of neighboring cells. Transmission component 199 may also be configured to receive, from a user equipment (UE), a request for rate matching or skipping rate matching for a cell-specific reference signal (CRS) offset associated with each of a plurality of neighboring cells based on a physical downlink shared channel (PDSCH) demodulation performance of the UE. Transmission component 199 may also be configured to initiate a timer when the request for the rate matching or skipping the rate matching is received, where the rate matching or skipping the rate matching is applied once the timer is initiated. Transmission component 199 may also be configured to apply, based on the received request, the rate matching or skipping the rate matching for the CRS offset associated with each of the plurality of neighboring cells. Transmission component 199 may also be configured to stop applying the rate matching or skipping the rate matching when the timer expires. Transmission component 199 may also be configured to transmit, to the UE, an indication of the rate matching or skipping the rate matching for the at the CRS offset associated with each of the plurality of neighboring cells.

Although the following description may be focused on 5G NR, the concepts described herein may be applicable to other similar areas, such as LTE, LTE-A, CDMA, GSM, and other wireless technologies.

Figure 2:
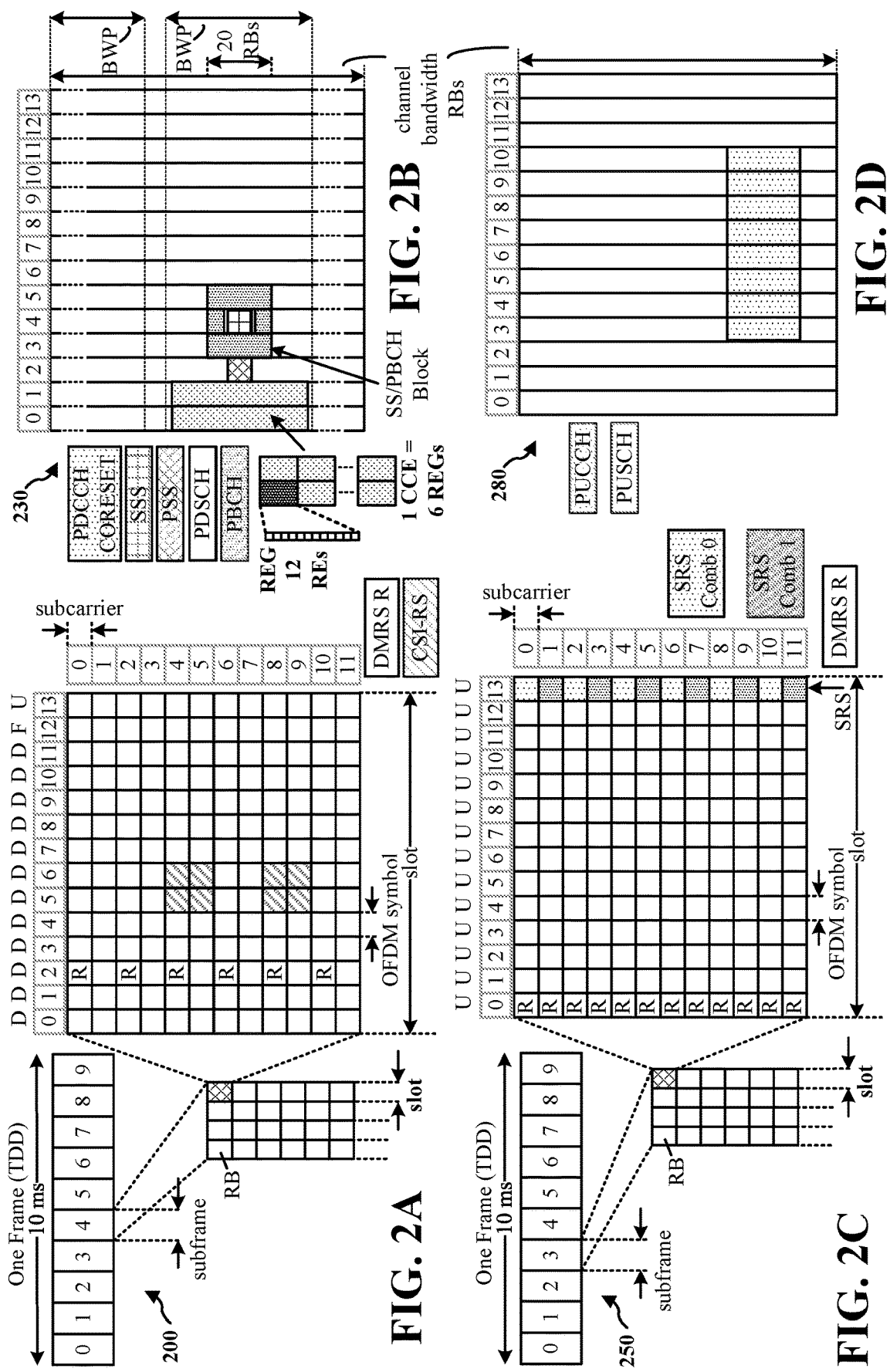
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
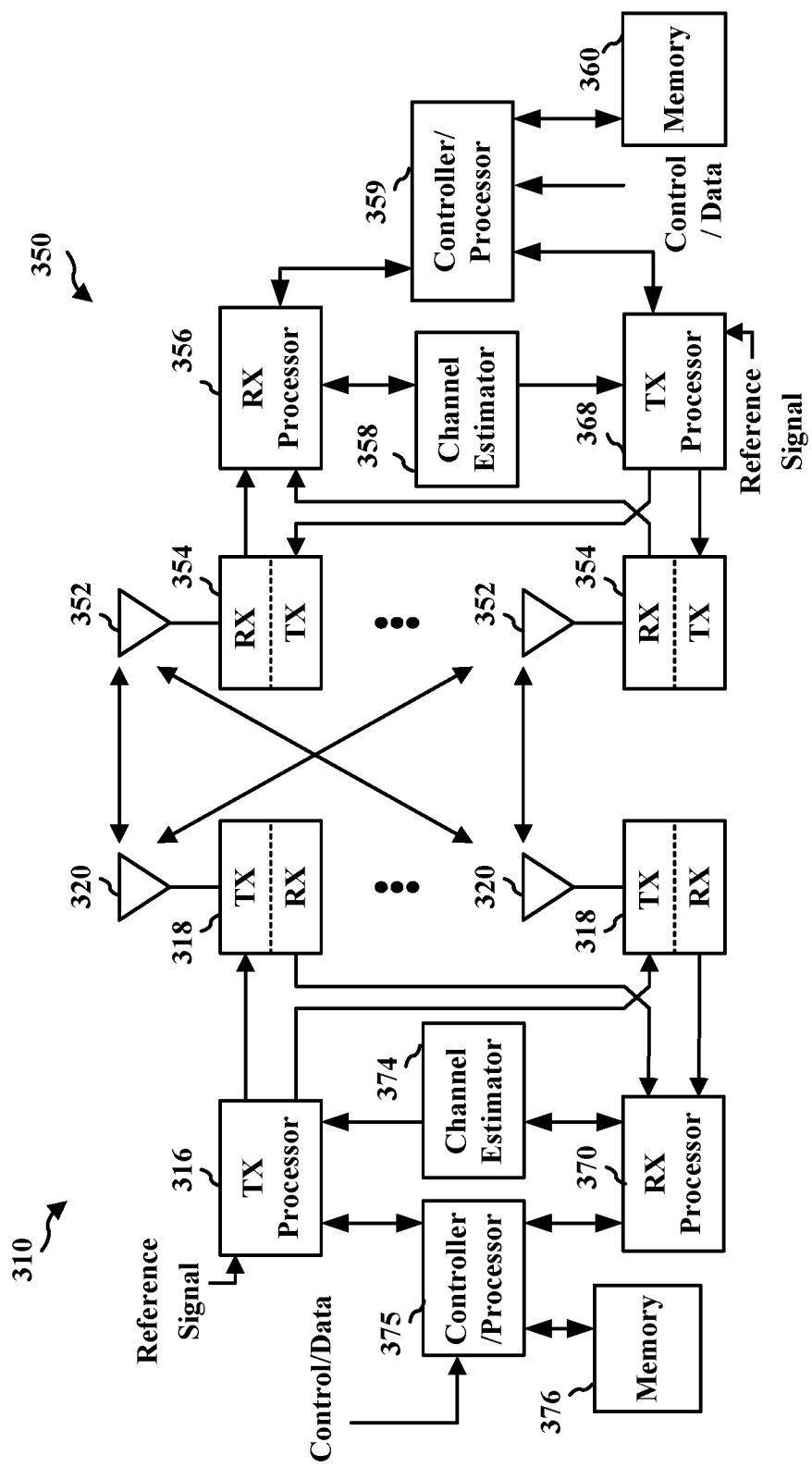
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communication may include dynamic spectrum sharing (DSS), i.e., a capability that allows for a simultaneous use of a wireless spectrum with different wireless technologies. For instance, DSS allows for the simultaneous use of new radio (NR) and longer term evolution (LTE) technologies. In some aspects of DSS deployment, e.g., NR DSS, both LTE and NR may share a same carrier in order to allow for a soft migration from LTE to NR. Additionally, using DSS, base stations may be able to determine whether to schedule certain types of wireless transmissions, e.g., LTE data transmissions, NR data transmissions, or both.

In some aspects of wireless communication, e.g., in LTE deployment, a physical downlink shared channel (PDSCH) demodulation performance may be affected by a cell-specific reference signal (CRS) interference from a neighboring cell, e.g., a neighbor LTE cell. The impact of CRS interference, e.g., LTE CRS interference, may be more prominent or impactful for certain networks, e.g., lightly loaded networks with non-colliding CRS configurations. Also, the impact of CRS interference, e.g., LTE CRS interference, may be mitigated by rate matching, e.g., PDSCH rate matching, around a neighbor cell LTE CRS. In some instances, PDSCH rate matching around a neighbor cell LTE CRS may be enabled when CRS interference is strong. For instance, this PDSCH rate matching may be disabled to avoid unnecessary resource waste when the CRS interference is weak.

In some instances, UEs and wireless devices may identify or determine certain DSS scenarios based on a number of different factors. For instance, a UE may determine a DSS scenario based on radio resource control (RRC) signaling related to DSS deployment. In some aspects, a UE may determine a DSS scenario based on PDCCH monitoring on any span of orthogonal frequency division multiplexing (OFDM) symbols, e.g., up to three (3) consecutive OFDM symbols of a slot, such as by utilizing a pdcchMonitoringSingleOccasion parameter. Additionally, a UE may determine a DSS scenario based on rate matching around a CRS, e.g., an LTE CRS, such as with a rateMatchingLTE-CRS parameter. A UE may also determine a DSS scenario based on alternative additional DMRS positions for co-existence with a CRS, e.g., an LTE CRS, such as by utilizing an additionalDMRS-DL-Alt parameter.

In some aspects of wireless communication, UEs may utilize certain types of CRSs, e.g., LTE CRSs, such as via DSS scenarios. Some types of CRSs, e.g., LTE CRSs for neighbor cells, may be staggered or offset in the frequency domain to avoid a CRS collision, such as a CRS collision with neighbor cell CRS. For example, the frequency domain offset (i.e., voffset) for CRSs may be a number of resource elements, e.g., an RE offset of zero (0), one (1), or two (2) resource elements (REs). By utilizing staggered or offset RSs or CRSs, a neighbor cell CRS may hit serving cell PDSCH tones.

Figure 4:
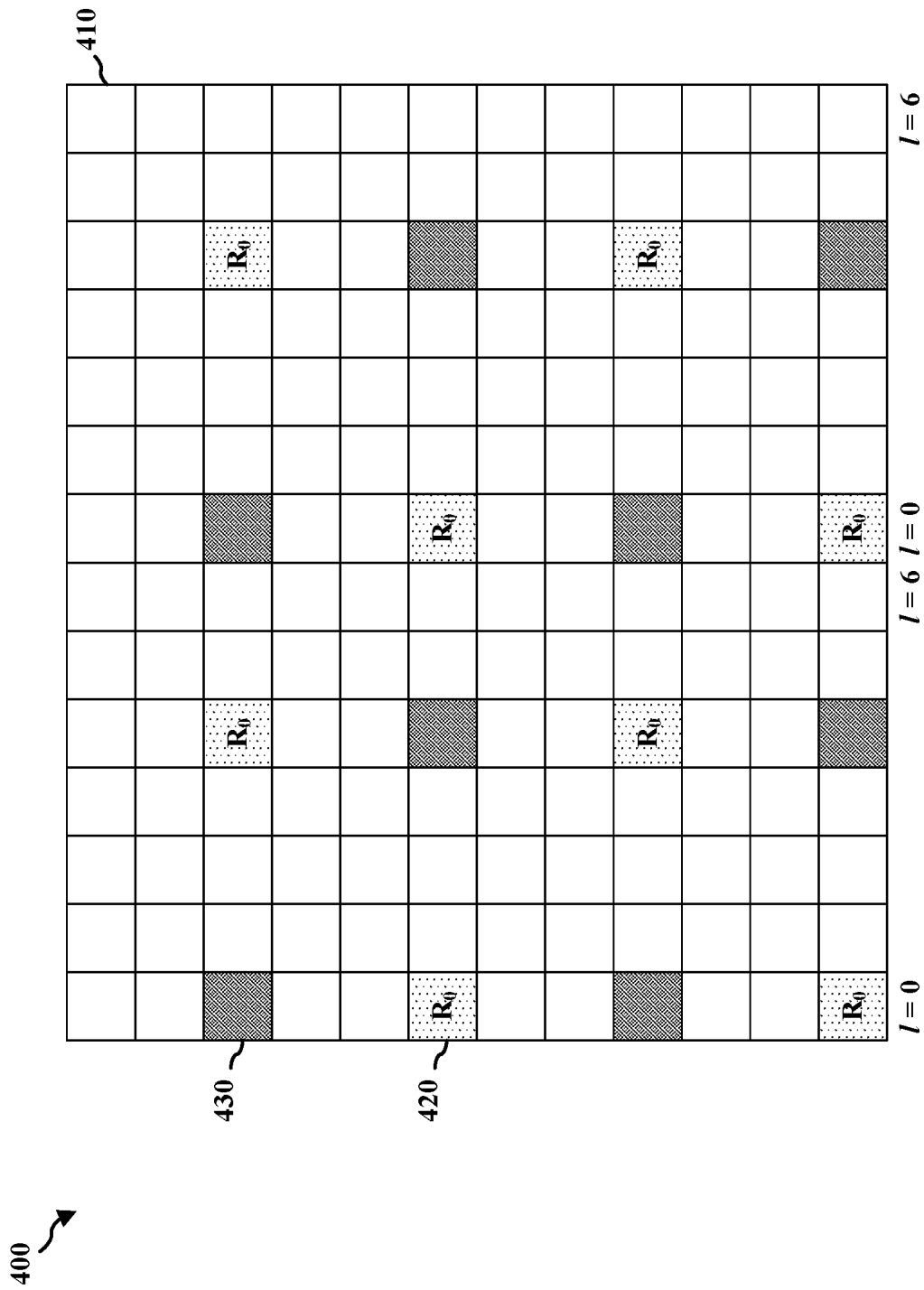
FIG. 4 is a diagram illustrating an example group of resource elements (REs) in accordance with one or more techniques of the present disclosure.
Figure 5:
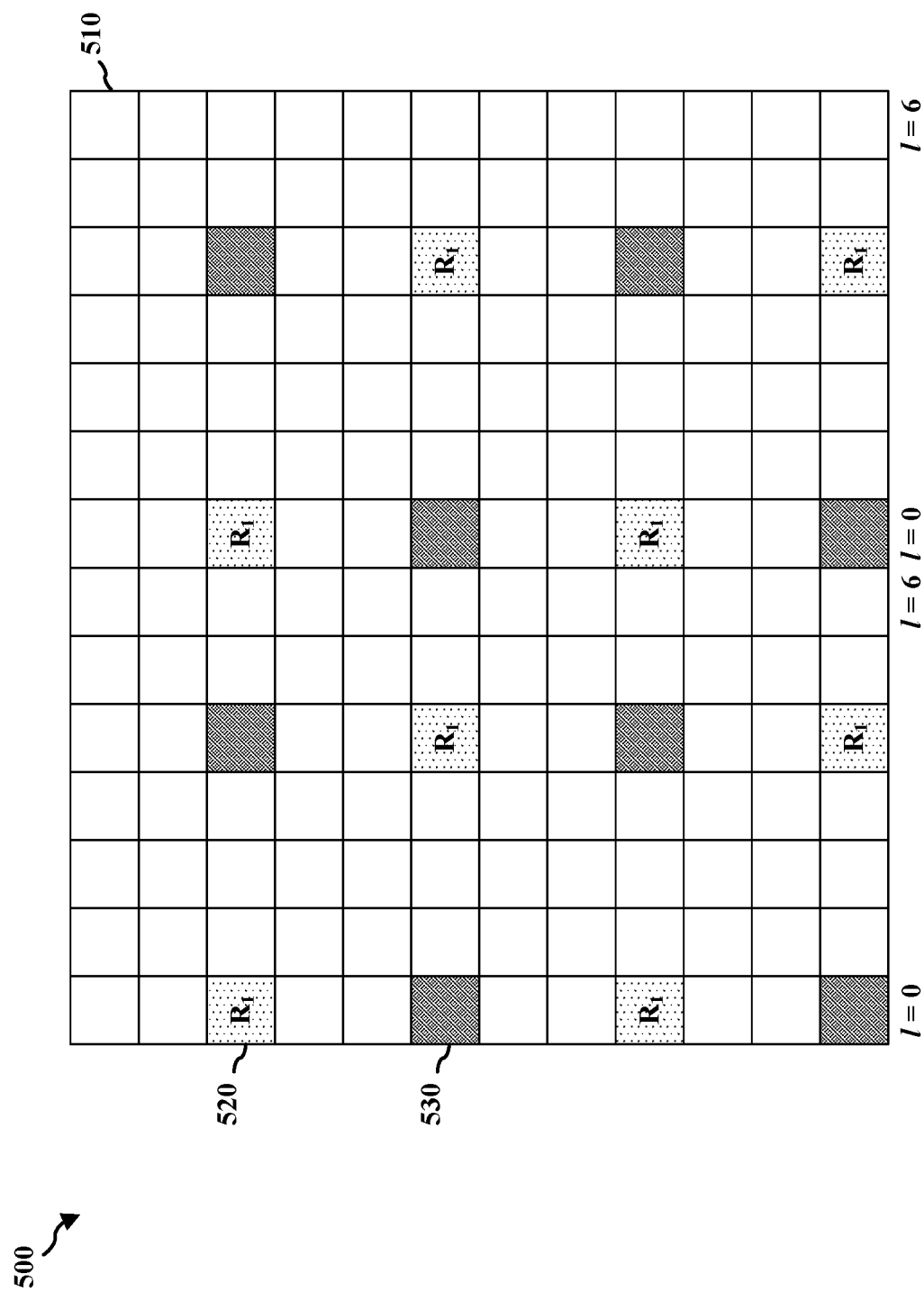
FIG. 5 is a diagram illustrating an example group of REs in accordance with one or more techniques of the present disclosure.

Some types of wireless communication may utilize rate matching, i.e., extracting the exact set of bits to be transmitted within a given transmission time interval (TTI). In some aspects of rate matching, the exact set of bits may be extracted from blocks of code bits, which may depend on the existing channel conditions of the CRS offset. For instance, rate matching may include a number of steps, such as sub-block interleaving, bit collection, and/or bit selection. With rate matching, a subset of tones or REs may not be utilized for data transmissions between a base station and a UE. For example, subset of tones or REs may not be utilized with rate matching as they may be potentially interfered with by a neighbor cell CRS. FIGS. 4 and 5 below illustrate different examples of offset RSs amongst a group of resource elements (REs).

FIG. 4 illustrates a diagram 400 of one example of a group of resource elements (REs) including offset reference signals (RSs). More specifically, diagram 400 is an example of RSs or CRSs that are offset in the frequency domain in a group of REs via rate matching. As shown in FIG. 4, diagram 400 includes a group of REs 410 including transmission REs 420 (i.e., REs with RSs ($R_0$)) and unused REs 430 (i.e., REs not used for transmission). As depicted in diagram 400, with rate matching, a subset of tones may not be utilized for data transmissions between a base station and a UE. For instance, a subset of tones or REs 410, e.g., unused REs 430, may not be utilized with rate matching, as these tones or REs 410 may be potentially interfered with by a neighbor cell CRS. As illustrated in FIG. 4, rate matching may remove some of the tones or REs 410 for a data transmission, e.g., unused REs 430, in order to reduce the likelihood of interference from a neighboring cell.

FIG. 5 illustrates a diagram 500 of one example of a group of REs including offset RSs. More specifically, diagram 500 is an example of RSs or CRSs that are offset in the frequency domain in a group of REs via rate matching. As shown in FIG. 5, diagram 500 includes a group of REs 510 including transmission REs 520 (i.e., REs with RSs ($R_1$)) and unused REs 530 (i.e., REs not used for transmission). Similar to FIG. 4, as shown in FIG. 5, rate matching may remove some of the tones or REs 510 for a data transmission, e.g., unused REs 530, in order to reduce the likelihood of interference from a neighboring cell. As shown in FIGS. 4 and 5, the REs used for transmission in FIG. 4 (i.e., transmission REs 420) correspond to the REs not used for transmission in FIG. 5 (i.e., unused REs 530). Likewise, the REs used for transmission in FIG. 5 (i.e., transmission REs 520) correspond to the REs not used for transmission in FIG. 4 (i.e., unused REs 430).

Based on the above, it may be beneficial to utilize rate matching with aspects of dynamic spectrum sharing (DSS). For instance, it may be beneficial to utilize rate matching in conjunction with CRS offsets. It may also be beneficial to utilize rate matching with CRS offsets associated with a number of neighboring cells. In some instances, it may also be beneficial to utilize information regarding a lack of rate matching.

Aspects of the present disclosure may utilize rate matching with dynamic spectrum sharing (DSS). For instance, aspects of the present disclosure may utilize rate matching in conjunction with CRS offsets. Further, aspects of the present disclosure may utilize rate matching with CRS offsets associated with a number of neighboring cells. For example, aspects of the present disclosure may request information regarding rate matching for CRS offsets associated with neighboring cells. This rate matching request may be based on a PDSCH demodulation performance. Also, aspects of the present disclosure may request information regarding a lack of rate matching (i.e., skipping rate matching) for CRS offsets associated with neighboring cells or neighbor cells.

Aspects of the present disclosure may allow for a UE to measure the CRSs of multiple neighbor cells. For instance, a UE may measure the reference signal received power (RSRP) of reference signals (RSs) or cell-specific RSs (CRSs) from multiple neighbor cells, e.g., LTE cells. In some instances, a UE may measure a strength of neighbor cells, e.g., LTE cells, based on an RSRP measurement of a CRS from each of the neighbor cells, e.g., an LTE CRS RSRP measurement. In some modes of wireless communication, e.g., E-UTRAN new radio-dual connectivity (EN-DC) mode, where an LTE neighbor cell and an NR neighbor cell are in the same carrier, a UE may rely on a certain type of intra-cell measurement, e.g., LTE intra-cell measurement. Additionally, in EN-DC mode, where an LTE neighbor cell and an NR neighbor cell are in different carriers and/or in a standalone (SA) NR mode, an RSRP of neighbor cells, e.g., LTE cells, may be measured via inter-radio access technology (RAT) measurement flow. As indicated herein, there may be multiple neighbor cells surrounding the UE and/or multiple types of neighbor cells, e.g., LTE cells and NR cells.

Figure 6:
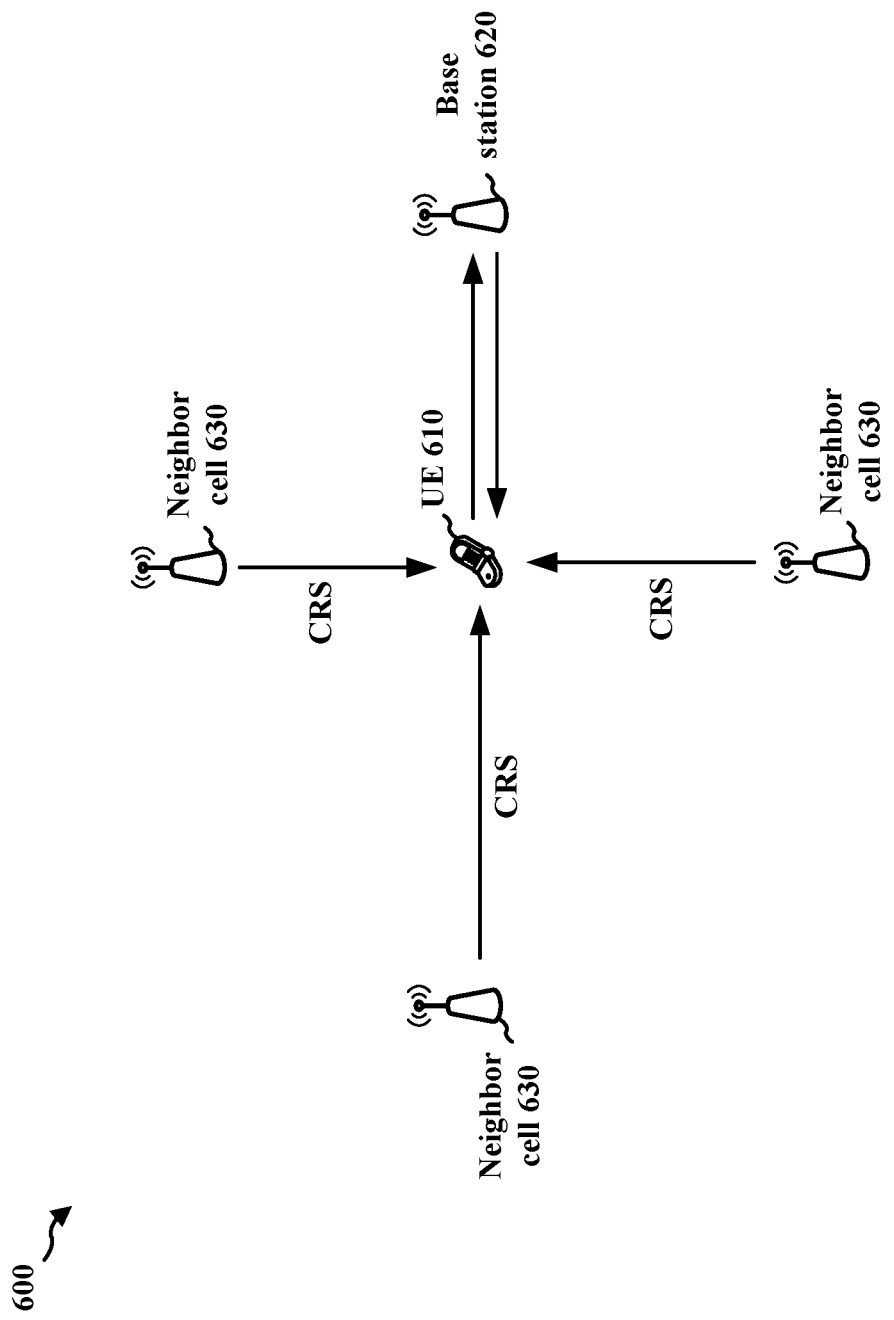
FIG. 6 is a diagram illustrating example communication between a UE, a serving cell, and neighbor cells in accordance with one or more techniques of the present disclosure.

FIG. 6 illustrates a diagram 600 of one example of communication between a UE, a base station, and multiple neighboring cells. As shown in FIG. 6, diagram 600 includes UE 610, base station 620 (i.e., a serving cell), and multiple neighbor cells 630. More specifically, diagram 600 is an example of UE 610 measuring RSs or CRSs from neighbor cells 630 and communicating with base station 620 (i.e., a serving cell). As depicted in FIG. 6, UE 610 may measure an RSRP of a CRS from each of the neighbor cells 630. UE 610 may also calculate an interference strength of each of the neighbor cells 630 based on the RSRP measurement of the CRS for each of the neighbor cells 630. In some aspects, UE 610 may also compare a PDSCH demodulation performance of the UE 610 based on rate matching for a CRS offset associated with each of the neighbor cells 630 with the PDSCH demodulation performance of the UE 610 based on skipping rate matching (i.e., a lack of rate matching) for the CRS offset associated with each of the neighbor cells 630. Based on the comparison of the PDSCH demodulation performance of the UE 610, the UE 610 may transmit, to base station 620, a request for rate matching or skipping rate matching (i.e., a lack of rate matching) for the CRS offset associated with each of the neighbor cells 630.

Aspects of the present disclosure may also allow for a UE to make a decision on rate matching around CRSs of multiple neighbor cells. In some aspects, a UE may compare a PDSCH demodulation performance on a serving cell or base station both with and without rate matching around a neighbor cell CRS. The comparison of the PDSCH demodulation performance with and without rate matching may be based on a received signal power difference between a CRS of a neighbor cell and a PDSCH of the serving cell or base station. In some instances, the neighbor cell CRS power may be obtained through RSRP measurement. Also, a PDSCH power of a serving cell or base station may be obtained by RSRP measurement (e.g., NR RSRP measurement) and/or a throughput power ratio (TPR) between a synchronization signal block (SSB) (e.g., NR SSB) and a PDSCH DMRS.

Additionally, the comparison of the PDSCH demodulation performance with and without rate matching may be based on an interference mitigation of the CRS for each of the neighbor cells. In some instances, a UE may consider a receiver algorithm to mitigate the interference from the neighbor cell CRSs, i.e., an interference mitigation scheme of neighbor cell CRSs. In one instance, a UE may perform no interference mitigation for the neighbor cell CRSs. Also, a UE may perform CRS interference cancellation (CRS-IC) for the neighbor cell CRSs. Further, a UE may perform log likelihood ratio (LLR) scaling and/or diagonal loading adaptation for symbols/tones affected by the neighbor cell CRSs.

In some aspects of the present disclosure, a UE may make a decision on the desired rate matching patterns for neighbor cell CRSs. In order to convey the decision on rate matching patterns, a UE may utilize a bitmap or a number of bits, e.g., transmit a number of bits to a serving cell or base station. For example, one combination of bits (e.g., '00') may imply that rate matching around a neighbor cell CRS is not necessary. Another combination of bits (e.g., '01') may imply rate matching around a neighbor cell CRS pattern with a first offset, e.g., an offset equal to 1. Also, another combination of bits (e.g., '10') may imply rate matching around a neighbor cell CRS pattern with a second offset, e.g., an offset equal to 2. Yet another combination of bits (e.g., '11') may imply rate matching around a neighbor cell CRS pattern with both a first offset, e.g., an offset equal to 1, and a second offset, e.g., an offset equal to 2.

In some aspects of the present disclosure, a UE may send a request for rate matching around a neighbor cell CRS. For instance, a UE may send a request for rate matching, or lack of rate matching, around a neighbor cell CRS to a serving cell or a base station. In one aspect, the request for rate matching, or lack of rate matching, may be sent via measurement reporting to the serving cell or base station. In another aspect, the request for rate matching, or lack of rate matching, may be sent via a medium access control (MAC) control element (MAC-CE), e.g., a MAC-CE for neighbor cell CRS rate matching.

If the request for rate matching, or lack of rate matching, is transmitted via measurement reporting, the request may be associated with a number of different procedures. For instance, a serving cell or base station may configure a measurement (e.g., an LTE measurement) in a serving carrier with a certain measurement types (e.g., a measurement type or LTE-RateMatching). For example, the UE may receive, from the base station, a configuration for an RSRP measurement of the CRS for each of the neighbor cells. Based on the configuration, a UE may measure an RSRP (e.g., an LTE RSRP) and then the UE may make a decision on rate matching around the neighbor cell CRS. Further, the UE may send the measurement report to the serving cell or base station, where the measurement report may include a number of CRS rate matching patterns and CRS tone offsets, i.e., vshift information.

If the request for rate matching, or lack of rate matching (i.e., skipping rate matching), is transmitted via a MAC-CE, the request may also be associated with a number of different procedures. For instance, a serving cell or base station may configure a UE to transmit a CRS rate matching request via the MAC-CE. For example, the UE may receive, from the base station, a configuration for an RSRP measurement of the CRS for each of the neighbor cells. Based on the configuration, a UE may send the desired CRS rate matching patterns and CRS tone offsets, i.e., vshift information, via the MAC-CE.

In some aspects of the present disclosure, a serving cell or base station may apply the CRS rate matching, or lack or rate matching (i.e., skipping rate matching). For instance, a serving cell or base station may apply the CRS rate matching, or lack or rate matching, based on the request from the UE. In some instances, upon receiving an RE request for rate matching around a neighbor cell CRS, a serving cell or base station may apply the requested rate matching, or lack of rate matching, to a physical downlink shared channel (PDSCH).

In some instances, the serving cell or base station may also transmit an indication of rate matching, or lack of rate matching, to the UE. In one aspect, the base station may enable/disable rate matching around the neighbor cell CRS via an RRC reconfiguration. In another aspect, the base station may indicate the rate matching around the neighbor cell CRS via a new bit field in downlink control information (DCI). This bit field in the DCI may be associated with a codepoint value. For example, a codepoint value of zero (0) may correspond to a lack of rate matching (i.e., skipping rate matching) around a neighbor cell CRS. A codepoint value of one (1) may correspond to rate matching around a first CRS offset, e.g., rate matching around a neighbor cell CRS with an offset of 1. A codepoint value of two (2) may correspond to rate matching around a second CRS offset, e.g., rate matching around a neighbor cell CRS with an offset of 2. A codepoint value of three (3) may correspond to rate matching around the first CRS offset and the second CRS offset, e.g., rate matching around a neighbor cell CRS with an offset of 1 and an offset of 2. Additionally, a serving cell or base station may indicate rate matching around a neighbor cell CRS via a MAC-CE.

In some instances, a timer may be utilized in order to avoid indefinite rate matching without a refreshed UE request. For instance, a timer may be reset when a serving cell or base station receives a UE request for rate matching around a neighbor cell CRS. The serving cell or base station may also apply rate matching while the timer is running. When the timer expires, the serving cell or base station may stop applying rate matching around the neighbor cell CRS. For example, the base station may initiate a timer when a request for the rate matching or skipping the rate matching is received, where the rate matching or skipping the rate matching is applied once the timer is initiated. Also, the serving cell or base station may stop applying the rate matching or skipping the rate matching when the timer expires.

Figure 7:
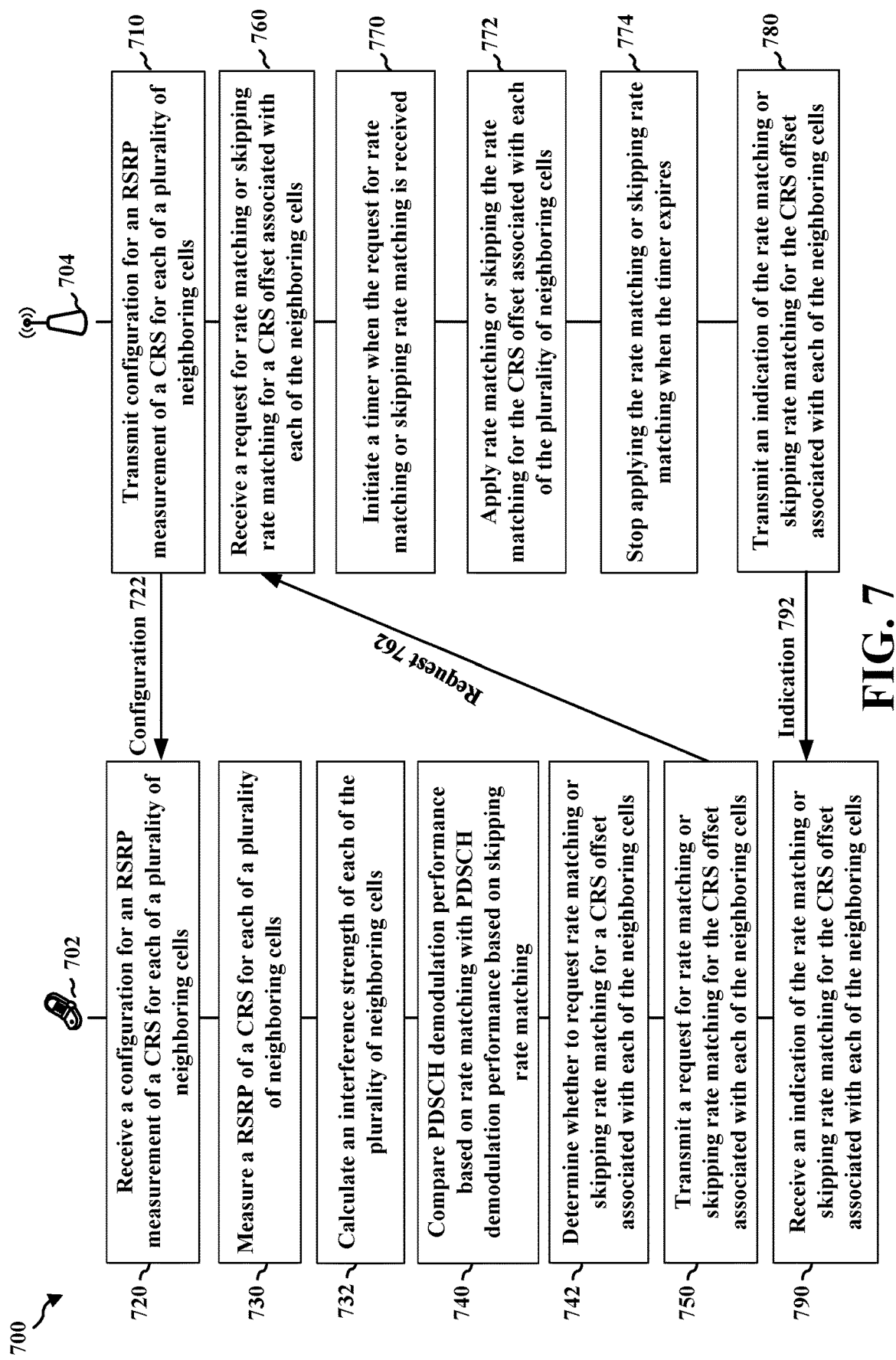
FIG. 7 is a diagram illustrating example communication between a UE and a base station in accordance with one or more techniques of the present disclosure.

FIG. 7 is a diagram 700 illustrating example communication between a UE 702 and a base station 704.

At 710, base station 704 may transmit, to a UE, a configuration for a reference signal received power (RSRP) measurement of a cell-specific reference signal (CRS) for each of a plurality of neighboring cells, e.g., configuration 722.

At 720, UE 702 may receive, from a base station, a configuration for a reference signal received power (RSRP) measurement of a cell-specific reference signal (CRS) for each of a plurality of neighboring cells, e.g., configuration 722. The RSRP measurement of the CRS for each of the plurality of neighboring cells may be a CRS RSRP measurement. The configuration for the RSRP measurement may be received via a serving cell, and the request for the rate matching or skipping the rate matching may be transmitted via measurement reporting. Also, the request for the rate matching or skipping the rate matching may be transmitted via a medium access control (MAC) control element (MAC-CE).

In some aspects, the UE may be operating with a same radio technology as all of the plurality of neighboring cells, and the RSRP measurement of the CRS for each of the plurality of neighboring cells corresponds to an intra-cell measurement. The UE may be operating with a different radio technology from all of the plurality of neighboring cells, and the RSRP measurement of the CRS for each of the plurality of neighboring cells corresponds to an inter-radio access technology (RAT) measurement. Moreover, the base station may be a serving cell associated with the plurality of neighboring cells.

At 730, UE 702 may measure a reference signal received power (RSRP) of a cell-specific reference signal (CRS) for each of a plurality of neighboring cells. The RSRP measurement may be based on the received configuration.

At 732, UE 702 may calculate an interference strength of each of the plurality of neighboring cells based on the RSRP measurement of the CRS for each of the plurality of neighboring cells.

At 740, UE 702 may compare, based on the calculated interference strength of each of the plurality of neighboring cells, a physical downlink shared channel (PDSCH)

demodulation performance of the UE based on rate matching for a CRS offset associated with each of the plurality of neighboring cells with the PDSCH demodulation performance of the UE based on skipping the rate matching for the CRS offset associated with each of the plurality of neighboring cells. The comparison of the PDSCH demodulation performance of the UE may be based on a difference between a received signal power of the CRS for one of the plurality of neighboring cells and a received signal power of the PDSCH. The comparison of the PDSCH demodulation performance of the UE may be based on an interference mitigation of the CRS for each of the plurality of neighboring cells.

At 742, UE 702 may determine whether to request the rate matching or skipping the rate matching for the CRS offset associated with each of the plurality of neighboring cells based on the comparison of the PDSCH demodulation performance of the UE, where the request is transmitted based on the determination. The rate matching for the CRS offset associated with each of the plurality of neighboring cells may correspond to a plurality of rate matching patterns, and skipping the rate matching for the CRS offset associated with each of the plurality of neighboring cells may correspond to no rate matching pattern. Additionally, a first rate matching pattern of the plurality of rate matching patterns may correspond to a first CRS offset, a second rate matching pattern of the plurality of rate matching patterns may correspond to a second CRS offset, the first CRS offset different from the second CRS offset, and a third rate matching pattern of the plurality of rate matching patterns may correspond to the first CRS offset and the second CRS offset.

At 750, UE 702 may transmit, to a base station, a request for the rate matching or skipping the rate matching for the CRS offset associated with each of the plurality of neighboring cells based on the comparison of the PDSCH demodulation performance of the UE, e.g., request 762.

At 760, base station 704 may receive, from a UE, a request for rate matching or skipping rate matching for a cell-specific reference signal (CRS) offset associated with each of a plurality of neighboring cells based on a physical downlink shared channel (PDSCH) demodulation performance of the UE, e.g., request 762.

At 770, base station 704 may initiate a timer when the request for the rate matching or skipping the rate matching is received, where the rate matching or skipping the rate matching is applied once the timer is initiated.

At 772, base station 704 may apply, based on the received request, the rate matching or skipping the rate matching for the CRS offset associated with each of the plurality of neighboring cells.

At 774, base station 704 may stop applying the rate matching or skipping the rate matching when the timer expires.

At 780, base station 704 may transmit, to the UE, an indication of the rate matching or skipping the rate matching for the at the CRS offset associated with each of the plurality of neighboring cells, e.g., indication 792.

At 790, UE 702 may receive, from the base station based on the transmitted request, an indication of the rate matching or skipping the rate matching for the CRS offset associated with each of the plurality of neighboring cells, e.g., indication 792. The indication of the rate matching or skipping the rate matching may be received via a medium access control (MAC) control element (MAC-CE), radio resource control (RRC) signaling, or downlink control information (DCI). Also, the indication of the rate matching or skipping the rate matching may be received via a bit field in the DCI associated with a codepoint value, and where the codepoint value of 0 may correspond to skipping the rate matching, the codepoint value of 1 may correspond to the rate matching around a first CRS offset, the codepoint value of 2 may correspond to the rate matching around a second CRS offset, and the codepoint value of 3 may correspond to the rate matching around the first CRS offset and the second CRS offset. The indication of the rate matching or skipping the rate matching may be based on a timer at the base station.

Figure 8:
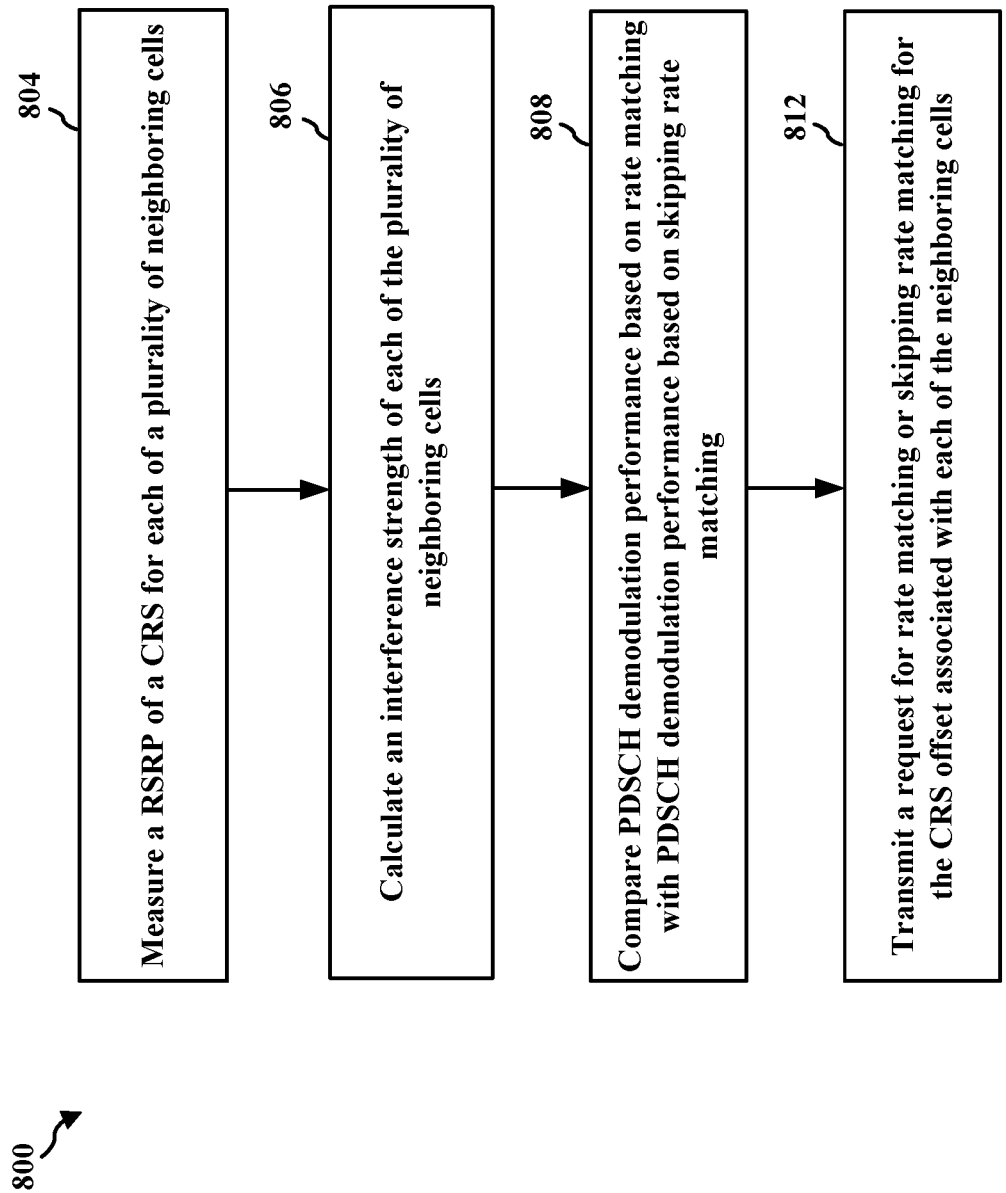
FIG. 8 is a flowchart of a method of wireless communication.

FIG. 8 is a flowchart 800 of a method of wireless communication. The method may be performed by a UE or a component of a UE (e.g., the UE 104, 350, 610, 702; the apparatus 1202). The methods described herein may provide a number of benefits, such as improving communication signaling, resource utilization, and/or power savings.

At 804, the UE may measure a reference signal received power (RSRP) of a cell-specific reference signal (CRS) for each of a plurality of neighboring cells, as described in connection with the examples in FIGS. 4-7. For example, UE 702 may measure a reference signal received power (RSRP) of a cell-specific reference signal (CRS) for each of a plurality of neighboring cells, as described in connection with 730 in FIG. 7. Further, 804 may be performed by determination component 1240 in FIG. 12. The RSRP measurement may be based on the received configuration.

At 806, the UE may calculate an interference strength of each of the plurality of neighboring cells based on the RSRP measurement of the CRS for each of the plurality of neighboring cells, as described in connection with the examples in FIGS. 4-7. For example, UE 702 may calculate an interference strength of each of the plurality of neighboring cells based on the RSRP measurement of the CRS for each of the plurality of neighboring cells, as described in connection with 732 in FIG. 7. Further, 806 may be performed by determination component 1240 in FIG. 12.

At 808, the UE may compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells, as described in connection with the examples in FIGS. 4-7. For example, UE 702 may compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells, as described in connection with 740 in FIG. 7. Further, 808 may be performed by determination component 1240 in FIG. 12. The comparison of the PDSCH demodulation performance of the UE may be based on a difference between a received signal power of the CRS for one of the plurality of neighboring cells and a received signal power of the PDSCH. The comparison of the PDSCH demodulation performance of the UE may be based on an interference mitigation of the CRS for each of the plurality of neighboring cells.

At 812, the UE may transmit, to a base station, a request for the rate matching or skipping the rate matching for the CRS offset associated with each of the plurality of neighboring cells based on the comparison of the PDSCH demodulation performance of the UE, as described in connection with the examples in FIGS. 4-7. For example, UE 702 may transmit, to a base station, a request for the rate matching or skipping the rate matching for the CRS offset associated with each of the plurality of neighboring cells based on the comparison of the PDSCH demodulation performance of the UE, as described in connection with 750 in FIG. 7. Further, 812 may be performed by determination component 1240 in FIG. 12.

Figure 9:
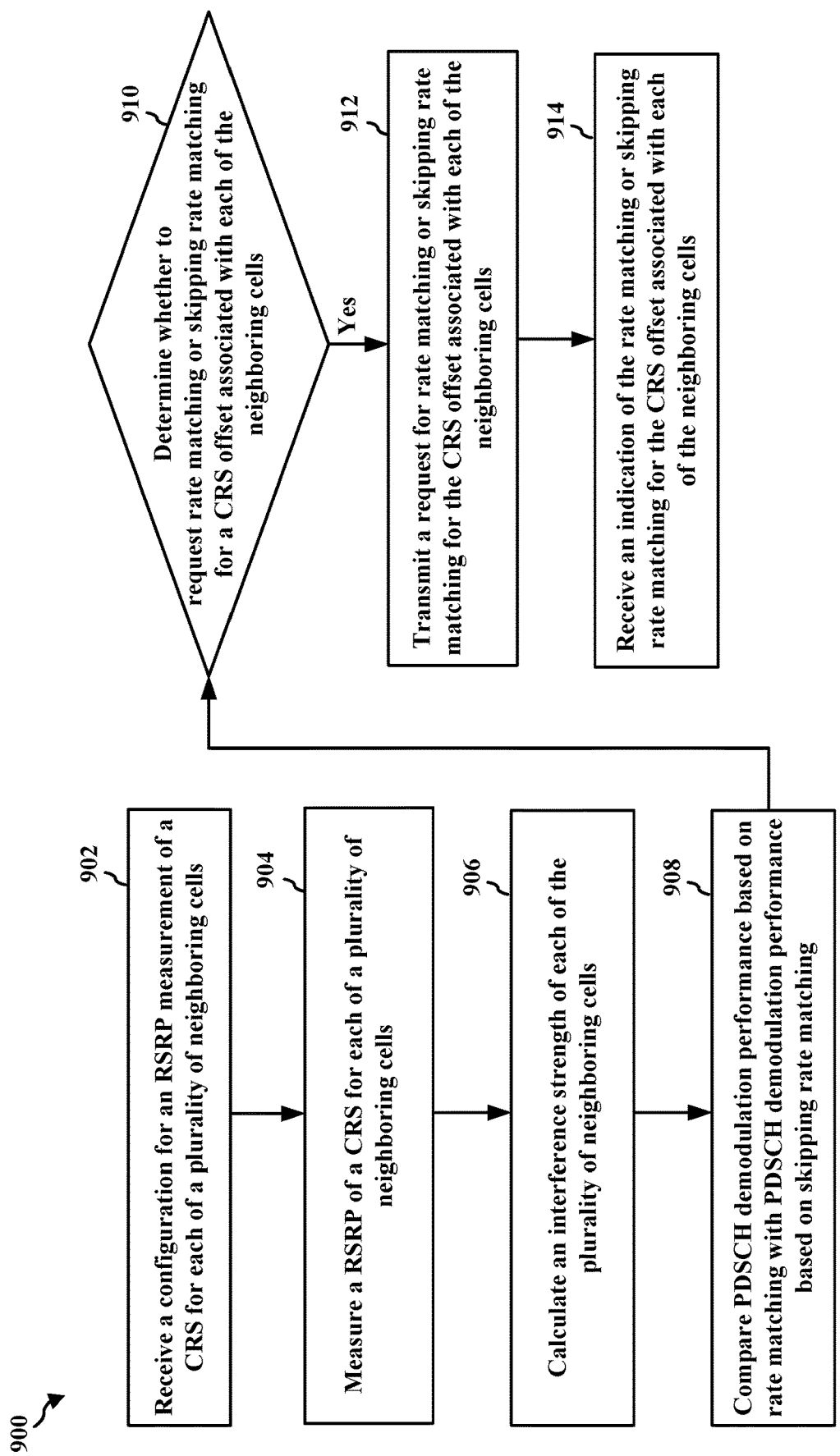
FIG. 9 is a flowchart of a method of wireless communication.

FIG. 9 is a flowchart 900 of a method of wireless communication. The method may be performed by a UE or a component of a UE (e.g., the UE 104, 350, 610, 702; the apparatus 1202). The methods described herein may provide a number of benefits, such as improving communication signaling, resource utilization, and/or power savings.

At 902, the UE may receive, from a base station, a configuration for a reference signal received power (RSRP) measurement of a cell-specific reference signal (CRS) for each of a plurality of neighboring cells, as described in connection with the examples in FIGS. 4-7. For example, UE 702 may receive, from a base station, a configuration for a reference signal received power (RSRP) measurement of a cell-specific reference signal (CRS) for each of a plurality of neighboring cells, as described in connection with 720 in FIG. 7. Further, 902 may be performed by determination component 1240 in FIG. 12. The RSRP measurement of the CRS for each of the plurality of neighboring cells may be a CRS RSRP measurement. The configuration for the RSRP measurement may be received via a serving cell, and the request for the rate matching or skipping the rate matching may be transmitted via measurement reporting. Also, the request for the rate matching or skipping the rate matching may be transmitted via a medium access control (MAC) control element (MAC-CE).

In some aspects, the UE may be operating with a same radio technology as all of the plurality of neighboring cells, and the RSRP measurement of the CRS for each of the plurality of neighboring cells corresponds to an intra-cell measurement. The UE may be operating with a different radio technology from all of the plurality of neighboring cells, and the RSRP measurement of the CRS for each of the plurality of neighboring cells corresponds to an inter-radio access technology (RAT) measurement. Moreover, the base station may be a serving cell associated with the plurality of neighboring cells.

At 904, the UE may measure a reference signal received power (RSRP) of a cell-specific reference signal (CRS) for each of a plurality of neighboring cells, as described in connection with the examples in FIGS. 4-7. For example, UE 702 may measure a reference signal received power (RSRP) of a cell-specific reference signal (CRS) for each of a plurality of neighboring cells, as described in connection with 730 in FIG. 7. Further, 904 may be performed by determination component 1240 in FIG. 12. The RSRP measurement may be based on the received configuration.

At 906, the UE may calculate an interference strength of each of the plurality of neighboring cells based on the RSRP measurement of the CRS for each of the plurality of neighboring cells, as described in connection with the examples in FIGS. 4-7. For example, UE 702 may calculate an interference strength of each of the plurality of neighboring cells based on the RSRP measurement of the CRS for each of the plurality of neighboring cells, as described in connection with 732 in FIG. 7. Further, 906 may be performed by determination component 1240 in FIG. 12.

At 908, the UE may compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells, as described in connection with the examples in FIGS. 4-7. For example, UE 702 may compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells, as described in connection with 740 in FIG. 7. Further, 908 may be performed by determination component 1240 in FIG. 12. The comparison of the PDSCH demodulation performance of the UE may be based on a difference between a received signal power of the CRS for one of the plurality of neighboring cells and a received signal power of the PDSCH. The comparison of the PDSCH demodulation performance of the UE may be based on an interference mitigation of the CRS for each of the plurality of neighboring cells.

At 910, the UE may determine whether to request the rate matching or skipping the rate matching for the CRS offset associated with each of the plurality of neighboring cells based on the comparison of the PDSCH demodulation performance of the UE, where the request is transmitted based on the determination, as described in connection with the examples in FIGS. 4-7. For example, UE 702 may determine whether to request the rate matching or skipping the rate matching for the CRS offset associated with each of the plurality of neighboring cells based on the comparison of the PDSCH demodulation performance of the UE, where the request is transmitted based on the determination, as described in connection with 742 in FIG. 7. Further, 910 may be performed by determination component 1240 in FIG. 12. The rate matching for the CRS offset associated with each of the plurality of neighboring cells may correspond to a plurality of rate matching patterns, and skipping the rate matching for the CRS offset associated with each of the plurality of neighboring cells may correspond to no rate matching pattern. Additionally, a first rate matching pattern of the plurality of rate matching patterns may correspond to a first CRS offset, a second rate matching pattern of the plurality of rate matching patterns may correspond to a second CRS offset, the first CRS offset different from the second CRS offset, and a third rate matching pattern of the plurality of rate matching patterns may correspond to the first CRS offset and the second CRS offset.

At 912, the UE may transmit, to a base station, a request for the rate matching or skipping the rate matching for the CRS offset associated with each of the plurality of neighboring cells based on the comparison of the PDSCH demodulation performance of the UE, as described in connection with the examples in FIGS. 4-7. For example, UE 702 may transmit, to a base station, a request for the rate matching or skipping the rate matching for the CRS offset associated with each of the plurality of neighboring cells based on the comparison of the PDSCH demodulation performance of the UE, as described in connection with 750 in FIG. 7. Further, 912 may be performed by determination component 1240 in FIG. 12.

At 914, the UE may receive, from the base station based on the transmitted request, an indication of the rate matching or skipping the rate matching for the CRS offset associated with each of the plurality of neighboring cells, as described in connection with the examples in FIGS. 4-7. For example, UE 702 may receive, from the base station based on the transmitted request, an indication of the rate matching or skipping the rate matching for the CRS offset associated with each of the plurality of neighboring cells, as described in connection with 790 in FIG. 7. Further, 914 may be performed by determination component 1240 in FIG. 12. The indication of the rate matching or skipping the rate matching may be received via a medium access control (MAC) control element (MAC-CE), radio resource control (RRC) signaling, or downlink control information (DCI). Also, the indication of the rate matching or skipping the rate matching may be received via a bit field in the DCI associated with a codepoint value, and where the codepoint value of 0 may correspond to skipping the rate matching, the codepoint value of 1 may correspond to the rate matching around a first CRS offset, the codepoint value of 2 may correspond to the rate matching around a second CRS offset, and the codepoint value of 3 may correspond to the rate matching around the first CRS offset and the second CRS offset. The indication of the rate matching or skipping the rate matching may be based on a timer at the base station.

Figure 10:
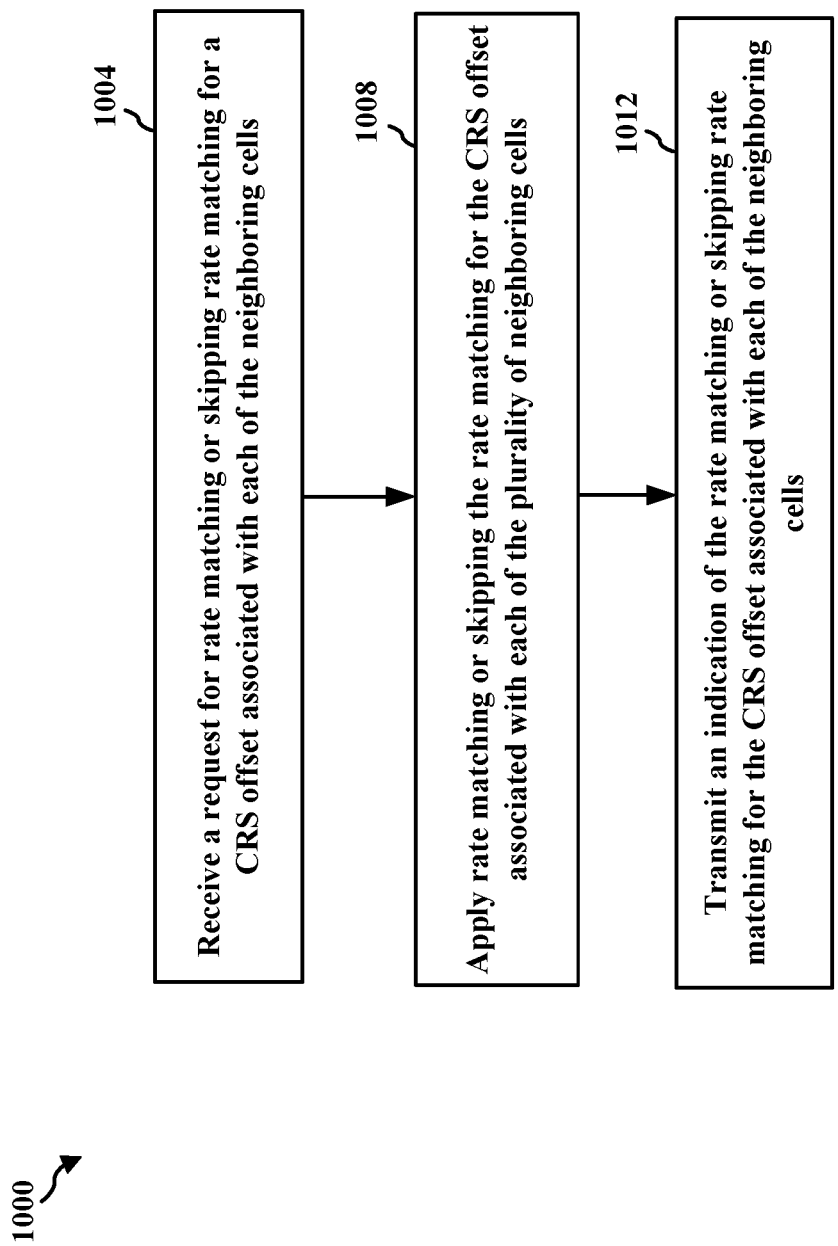
FIG. 10 is a flowchart of a method of wireless communication.

FIG. 10 is a flowchart 1000 of a method of wireless communication. The method may be performed by a base station or a component of a base station (e.g., the base station 102, 180, 310, 620, 704; the apparatus 1302). The methods described herein may provide a number of benefits, such as improving communication signaling, resource utilization, and/or power savings.

At 1004, the base station may receive, from a UE, a request for rate matching or skipping rate matching for a cell-specific reference signal (CRS) offset associated with each of a plurality of neighboring cells based on a physical downlink shared channel (PDSCH) demodulation performance of the UE, as described in connection with the examples in FIGS. 4-7. For example, base station 704 may receive, from a UE, a request for rate matching or skipping rate matching for a cell-specific reference signal (CRS) offset associated with each of a plurality of neighboring cells based on a physical downlink shared channel (PDSCH) demodulation performance of the UE, as described in connection with 760 in FIG. 7. Further, 1004 may be performed by determination component 1340 in FIG. 13. The request for the rate matching or skipping the rate matching may be received via measurement reporting. The request for the rate matching or skipping the rate matching may also be received via a medium access control (MAC) control element (MAC-CE). The base station may be a serving cell associated with the plurality of neighboring cells.

In some aspects, the UE and all of the plurality of neighboring cells may be associated with a same radio technology, and a reference signal received power (RSRP) measurement of the CRS for each of the plurality of neighboring cells may correspond to an intra-cell measurement. The UE and all the plurality of neighboring cells may be associated with a different radio technology, and a reference signal received power (RSRP) measurement of the CRS for each of the plurality of neighboring cells may correspond to an inter-radio access technology (RAT) measurement. The PDSCH demodulation performance of the UE may be based on a difference between a signal power of the CRS for one of the plurality of neighboring cells and a signal power of the PDSCH of the UE. The PDSCH demodulation performance of the UE may be based on an interference mitigation of the CRS for each of the plurality of neighboring cells.

At 1008, the base station may apply, based on the received request, the rate matching or skipping the rate matching for the CRS offset associated with each of the plurality of neighboring cells, as described in connection with the examples in FIGS. 4-7. For example, base station 704 may apply, based on the received request, the rate matching or skipping the rate matching for the CRS offset associated with each of the plurality of neighboring cells, as described in connection with 772 in FIG. 7. Further, 1008 may be performed by determination component 1340 in FIG. 13. The rate matching for the CRS offset associated with each of the plurality of neighboring cells may correspond to a plurality of rate matching patterns, and skipping the rate matching for the CRS offset associated with each of the plurality of neighboring cells may correspond to no rate matching pattern. Also, a first rate matching pattern of the plurality of rate matching patterns may correspond to a first CRS offset, a second rate matching pattern of the plurality of rate matching patterns may correspond to a second CRS offset, the first CRS offset being different from the second CRS offset, and a third rate matching pattern of the plurality of rate matching patterns may correspond to the first CRS offset and the second CRS offset.

At 1012, the base station may transmit, to the UE, an indication of the rate matching or skipping the rate matching for the at the CRS offset associated with each of the plurality of neighboring cells, as described in connection with the examples in FIGS. 4-7. For example, base station 704 may transmit, to the UE, an indication of the rate matching or skipping the rate matching for the at the CRS offset associated with each of the plurality of neighboring cells, as described in connection with 780 in FIG. 7. Further, 1012 may be performed by determination component 1340 in FIG. 13. The indication of the rate matching or skipping the rate matching may be transmitted via a medium access control (MAC) control element (MAC-CE), radio resource control (RRC) signaling, or downlink control information (DCI). The indication of the rate matching or skipping the rate matching may be transmitted via a bit field in the DCI associated with a codepoint value, and where the codepoint value of 0 may correspond to skipping the rate matching, the codepoint value of 1 may correspond to the rate matching around a first CRS offset, the codepoint value of 2 may correspond to the rate matching around a second CRS offset, and the codepoint value of 3 may correspond to the rate matching around the first CRS offset and the second CRS offset.

Figure 11:
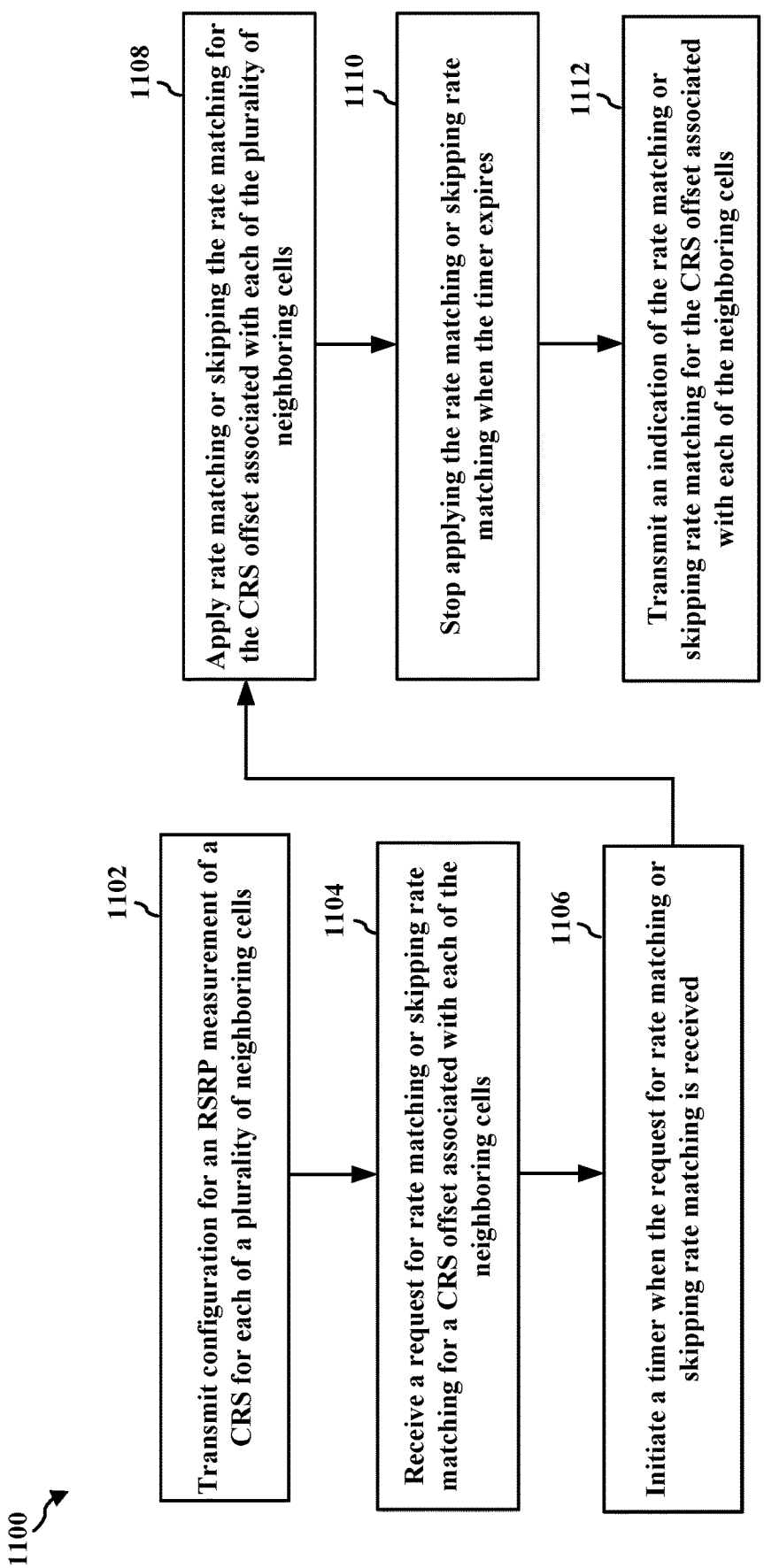
FIG. 11 is a flowchart of a method of wireless communication.

FIG. 11 is a flowchart 1100 of a method of wireless communication. The method may be performed by a base station or a component of a base station (e.g., the base station 102, 180, 310, 620, 704; the apparatus 1302). The methods described herein may provide a number of benefits, such as improving communication signaling, resource utilization, and/or power savings.

At 1102, the base station may transmit, to a user equipment (UE), a configuration for a reference signal received power (RSRP) measurement of a cell-specific reference signal (CRS) for each of a plurality of neighboring cells, as described in connection with the examples in FIGS. 4-7. For example, base station 704 may transmit, to a user equipment (UE), a configuration for a reference signal received power (RSRP) measurement of a cell-specific reference signal (CRS) for each of a plurality of neighboring cells, as described in connection with 710 in FIG. 7. Further, 1102 may be performed by determination component 1340 in FIG. 13. The configuration for the RSRP measurement may be transmitted via a serving cell, i.e., a base station.

At 1104, the base station may receive, from a UE, a request for rate matching or skipping rate matching for a cell-specific reference signal (CRS) offset associated with each of a plurality of neighboring cells based on a physical downlink shared channel (PDSCH) demodulation performance of the UE, as described in connection with the examples in FIGS. 4-7. For example, base station 704 may receive, from a UE, a request for rate matching or skipping rate matching for a cell-specific reference signal (CRS) offset associated with each of a plurality of neighboring cells based on a physical downlink shared channel (PDSCH) demodulation performance of the UE, as described in connection with 760 in FIG. 7. Further, 1104 may be performed by determination component 1340 in FIG. 13. The request for the rate matching or skipping the rate matching may be received via measurement reporting. The request for the rate matching or skipping the rate matching may also be received via a medium access control (MAC) control element (MAC-CE). The base station may be a serving cell associated with the plurality of neighboring cells.

In some aspects, the UE and all of the plurality of neighboring cells may be associated with a same radio technology, and a reference signal received power (RSRP) measurement of the CRS for each of the plurality of neighboring cells may correspond to an intra-cell measurement. The UE and all the plurality of neighboring cells may be associated with a different radio technology, and a reference signal received power (RSRP) measurement of the CRS for each of the plurality of neighboring cells may correspond to an inter-radio access technology (RAT) measurement. The PDSCH demodulation performance of the UE may be based on a difference between a signal power of the CRS for one of the plurality of neighboring cells and a signal power of the PDSCH of the UE. The PDSCH demodulation performance of the UE may be based on an interference mitigation of the CRS for each of the plurality of neighboring cells.

At 1106, the base station may initiate a timer when the request for the rate matching or skipping the rate matching is received, where the rate matching or skipping the rate matching is applied once the timer is initiated, as described in connection with the examples in FIGS. 4-7. For example, base station 704 may initiate a timer when the request for the rate matching or skipping the rate matching is received, where the rate matching or skipping the rate matching is applied once the timer is initiated, as described in connection with 770 in FIG. 7. Further, 1106 may be performed by determination component 1340 in FIG. 13.

At 1108, the base station may apply, based on the received request, the rate matching or skipping the rate matching for the CRS offset associated with each of the plurality of neighboring cells, as described in connection with the examples in FIGS. 4-7. For example, base station 704 may apply, based on the received request, the rate matching or skipping the rate matching for the CRS offset associated with each of the plurality of neighboring cells, as described in connection with 772 in FIG. 7. Further, 1108 may be performed by determination component 1340 in FIG. 13. The rate matching for the CRS offset associated with each of the plurality of neighboring cells may correspond to a plurality of rate matching patterns, and skipping the rate matching for the CRS offset associated with each of the plurality of neighboring cells may correspond to no rate matching pattern. Also, a first rate matching pattern of the plurality of rate matching patterns may correspond to a first CRS offset, a second rate matching pattern of the plurality of rate matching patterns may correspond to a second CRS offset, the first CRS offset being different from the second CRS offset, and a third rate matching pattern of the plurality of rate matching patterns may correspond to the first CRS offset and the second CRS offset.

At 1110, the base station may stop applying the rate matching or skipping the rate matching when the timer expires, as described in connection with the examples in FIGS. 4-7. For example, base station 704 may stop applying the rate matching or skipping the rate matching when the timer expires, as described in connection with 774 in FIG. 7. Further, 1110 may be performed by determination component 1340 in FIG. 13.

At 1112, the base station may transmit, to the UE, an indication of the rate matching or skipping the rate matching for the at the CRS offset associated with each of the plurality of neighboring cells, as described in connection with the examples in FIGS. 4-7. For example, base station 704 may transmit, to the UE, an indication of the rate matching or skipping the rate matching for the at the CRS offset associated with each of the plurality of neighboring cells, as described in connection with 780 in FIG. 7. Further, 1112 may be performed by determination component 1340 in FIG. 13. The indication of the rate matching or skipping the rate matching may be transmitted via a medium access control (MAC) control element (MAC-CE), radio resource control (RRC) signaling, or downlink control information (DCI). The indication of the rate matching or skipping the rate matching may be transmitted via a bit field in the DCI associated with a codepoint value, and where the codepoint value of 0 may correspond to skipping the rate matching, the codepoint value of 1 may correspond to the rate matching around a first CRS offset, the codepoint value of 2 may correspond to the rate matching around a second CRS offset, and the codepoint value of 3 may correspond to the rate matching around the first CRS offset and the second CRS offset.

Figure 12:
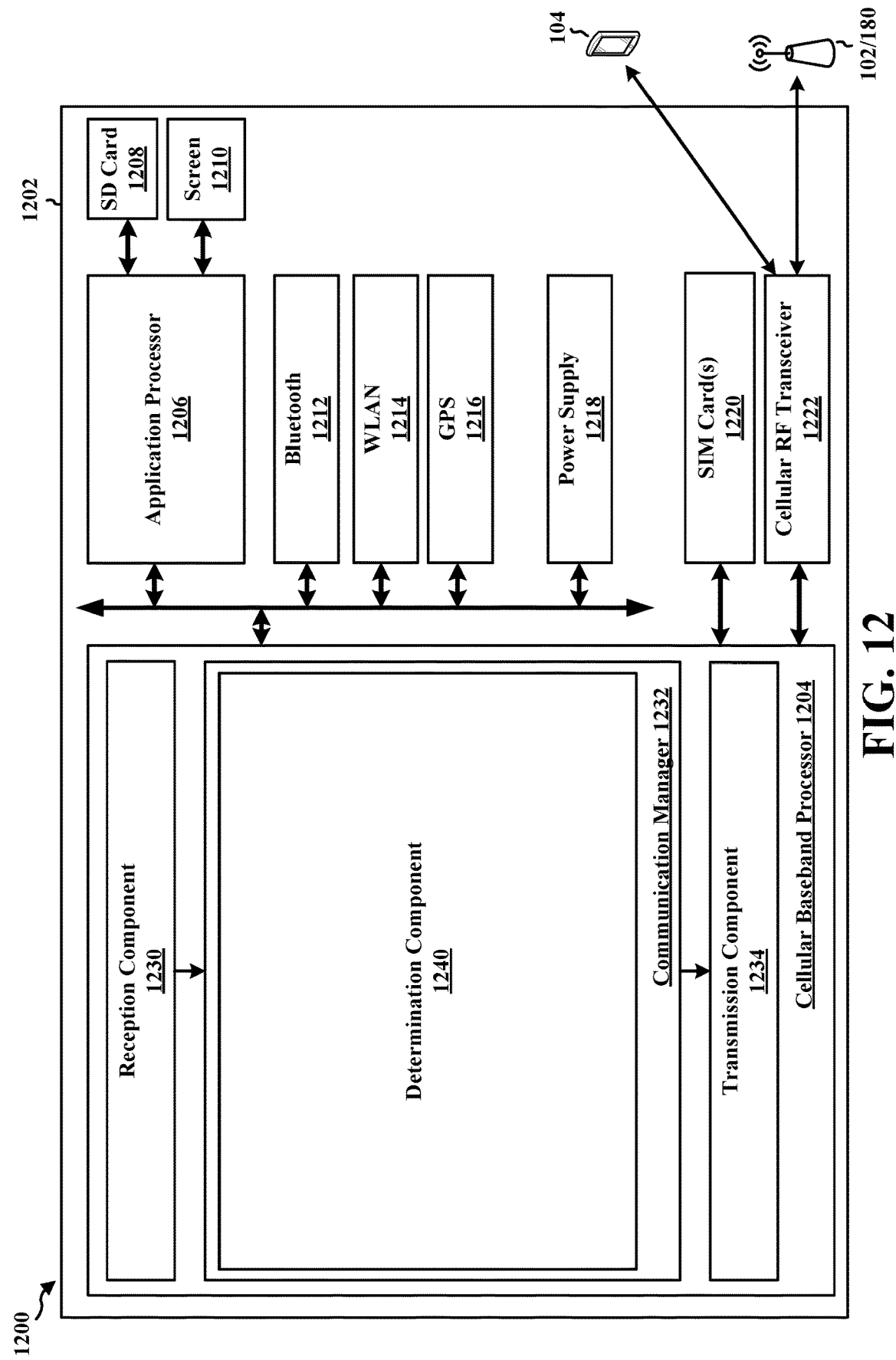
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a determination component 1240 that is configured to receive, from a base station, a configuration for an RSRP measurement of a CRS for each of a plurality of neighboring cells, e.g., as described in connection with step 902 above. Determination component 1240 may also be configured to measure a reference signal received power (RSRP) of a cell-specific reference signal (CRS) for each of a plurality of neighboring cells, e.g., as described in connection with step 904 above. Determination component 1240 may also be configured to calculate an interference strength of each of the plurality of neighboring cells based on the RSRP measurement of the CRS for each of the plurality of neighboring cells, e.g., as described in connection with step 906 above. Determination component 1240 may also be configured to compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells, e.g., as described in connection with step 908 above. Determination component 1240 may also be configured to determine whether to request the rate matching or skipping the rate matching for the CRS offset associated with each of the plurality of neighboring cells based on the comparison of the PDSCH demodulation performance of the UE, where the request is transmitted based on the determination, e.g., as described in connection with step 910 above. Determination component 1240 may also be configured to transmit, to a base station, a request for the rate matching or skipping the rate matching for the CRS offset associated with each of the plurality of neighboring cells based on the comparison of the PDSCH demodulation performance of the UE, e.g., as described in connection with step 912 above. Determination component 1240 may also be configured to receive, from the base station based on the transmitted request, an indication of the rate matching or skipping the rate matching for the CRS offset associated with each of the plurality of neighboring cells, e.g., as described in connection with step 914 above.

The apparatus may include additional components that perform each of the blocks of the algorithm in the flowcharts of FIGS. 7, 8, and 9. As such, each block in the flowcharts of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from a base station, a configuration for an RSRP measurement of a CRS for each of a plurality of neighboring cells; means for measuring a reference signal received power (RSRP) of a cell-specific reference signal (CRS) for each of a plurality of neighboring cells; means for calculating an interference strength of each of the plurality of neighboring cells based on the RSRP measurement of the CRS for each of the plurality of neighboring cells; means for comparing, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells; means for determining whether to request the rate matching or skipping the rate matching for the CRS offset associated with each of the plurality of neighboring cells based on the comparison of the PDSCH demodulation performance of the UE, where the request is transmitted based on the determination; means for transmitting, to a base station, a request for the rate matching or skipping the rate matching for the CRS offset associated with each of the plurality of neighboring cells based on the comparison of the PDSCH demodulation performance of the UE; and means for receiving, from the base station based on the transmitted request, an indication of the rate matching or skipping the rate matching for the CRS offset associated with each of the plurality of neighboring cells. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
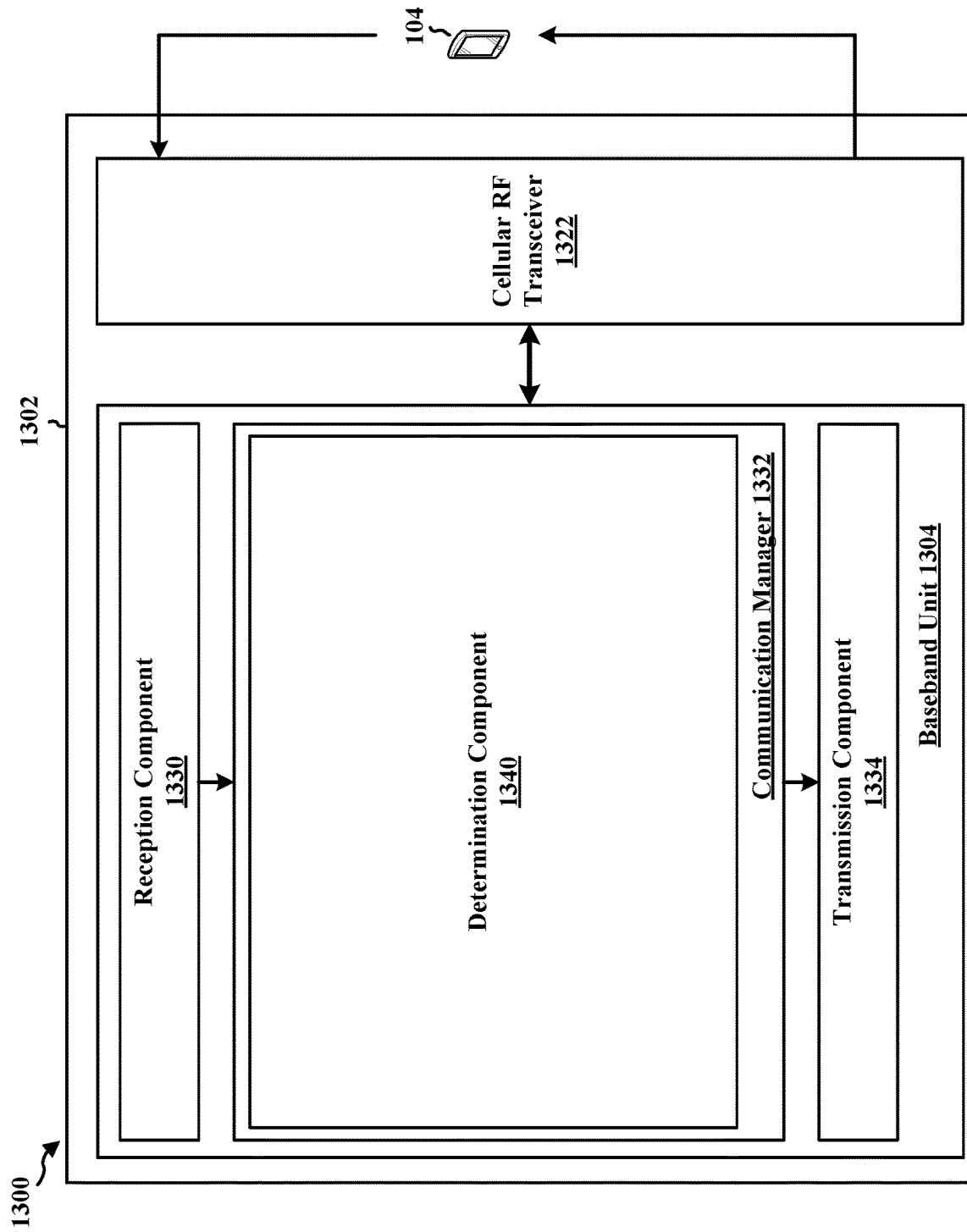
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a determination component 1340 that is configured to transmit, to a UE, a configuration for a reference signal received power (RSRP) measurement of a CRS for each of a plurality of neighboring cells, e.g., as described in connection with step 1102 above. Determination component 1340 may also be configured to receive, from a user equipment (UE), a request for rate matching or skipping rate matching for a cell-specific reference signal (CRS) offset associated with each of a plurality of neighboring cells based on a physical downlink shared channel (PDSCH) demodulation performance of the UE, e.g., as described in connection with step 1104 above. Determination component 1340 may also be configured to initiate a timer when the request for the rate matching or skipping the rate matching is received, where the rate matching or skipping the rate matching is applied once the timer is initiated, e.g., as described in connection with step 1106 above. Determination component 1340 may also be configured to apply, based on the received request, the rate matching or skipping the rate matching for the CRS offset associated with each of the plurality of neighboring cells, e.g., as described in connection with step 1108 above. Determination component 1340 may also be configured to stop applying the rate matching or skipping the rate matching when the timer expires, e.g., as described in connection with step 1110 above. Determination component 1340 may also be configured to transmit, to the UE, an indication of the rate matching or skipping the rate matching for the at the CRS offset associated with each of the plurality of neighboring cells, e.g., as described in connection with step 1112 above.

The apparatus may include additional components that perform each of the blocks of the algorithm in the flowcharts of FIGS. 7, 10, and 11. As such, each block in the flowcharts of FIGS. 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting, to a UE, a configuration for a reference signal received power (RSRP) measurement of a CRS for each of a plurality of neighboring cells; means for receiving, from a user equipment (UE), a request for rate matching or skipping rate matching for a cell-specific reference signal (CRS) offset associated with each of a plurality of neighboring cells based on a physical downlink shared channel (PDSCH) demodulation performance of the UE; means for initiating a timer when the request for the rate matching or skipping the rate matching is received, where the rate matching or skipping the rate matching is applied once the timer is initiated; means for applying, based on the received request, the rate matching or skipping the rate matching for the CRS offset associated with each of the plurality of neighboring cells; means for stopping applying the rate matching or skipping the rate matching when the timer expires; and means for transmitting, to the UE, an indication of the rate matching or skipping the rate matching for the at the CRS offset associated with each of the plurality of neighboring cells. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: measure a reference signal received power (RSRP) of a cell-specific reference signal (CRS) for each of a plurality of neighboring cells; calculate an interference strength of each of the plurality of neighboring cells based on the RSRP measurement of the CRS for each of the plurality of neighboring cells; compare, based on the calculated interference strength of each of the plurality of neighboring cells, a physical downlink shared channel (PDSCH) demodulation performance of the UE based on rate matching for a CRS offset associated with each of the plurality of neighboring cells with the PDSCH demodulation performance of the UE based on skipping the rate matching for the CRS offset associated with each of the plurality of neighboring cells; and transmit, to a base station, a request for the rate matching or skipping the rate matching for the CRS offset associated with each of the plurality of neighboring cells based on the comparison of the PDSCH demodulation performance of the UE.

Aspect 2 is the apparatus of aspect 1, where the at least one processor is further configured to: receive, from the base station based on the transmitted request, an indication of the rate matching or skipping the rate matching for the CRS offset associated with each of the plurality of neighboring cells.

Aspect 3 is the apparatus of any of aspects 1 and 2, where the indication of the rate matching or skipping the rate matching is received via a medium access control (MAC) control element (MAC-CE), radio resource control (RRC) signaling, or downlink control information (DCI).

Aspect 4 is the apparatus of any of aspects 1 to 3, where the indication of the rate matching or skipping the rate matching is received via a bit field in the DCI associated with a codepoint value, and where the codepoint value of 0 corresponds to skipping the rate matching, the codepoint value of 1 corresponds to the rate matching around a first CRS offset, the codepoint value of 2 corresponds to the rate matching around a second CRS offset, and the codepoint value of 3 corresponds to the rate matching around the first CRS offset and the second CRS offset.

Aspect 5 is the apparatus of any of aspects 1 to 4, where the indication of the rate matching or skipping the rate matching is based on a timer at the base station.

Aspect 6 is the apparatus of any of aspects 1 to 5, where the RSRP measurement of the CRS for each of the plurality of neighboring cells is a CRS RSRP measurement.

Aspect 7 is the apparatus of any of aspects 1 to 6, where the UE is operating with a same radio technology as all of the plurality of neighboring cells, and the RSRP measurement of the CRS for each of the plurality of neighboring cells corresponds to an intra-cell measurement.

Aspect 8 is the apparatus of any of aspects 1 to 7, where the UE is operating with a different radio technology from all of the plurality of neighboring cells, and the RSRP measurement of the CRS for each of the plurality of neighboring cells corresponds to an inter-radio access technology (RAT) measurement.

Aspect 9 is the apparatus of any of aspects 1 to 8, where the comparison of the PDSCH demodulation performance of the UE is based on a difference between a received signal power of the CRS for one of the plurality of neighboring cells and a received signal power of the PDSCH.

Aspect 10 is the apparatus of any of aspects 1 to 9, where the comparison of the PDSCH demodulation performance of the UE is based on an interference mitigation of the CRS for each of the plurality of neighboring cells.

Aspect 11 is the apparatus of any of aspects 1 to 10, where the at least one processor is further configured to: determine whether to request the rate matching or skipping the rate matching for the CRS offset associated with each of the plurality of neighboring cells based on the comparison of the PDSCH demodulation performance of the UE, where the request is transmitted based on the determination.

Aspect 12 is the apparatus of any of aspects 1 to 11, where the rate matching for the CRS offset associated with each of the plurality of neighboring cells corresponds to a plurality of rate matching patterns, and skipping the rate matching for the CRS offset associated with each of the plurality of neighboring cells corresponds to no rate matching pattern.

Aspect 13 is the apparatus of any of aspects 1 to 12, where a first rate matching pattern of the plurality of rate matching patterns corresponds to a first CRS offset, a second rate matching pattern of the plurality of rate matching patterns corresponds to a second CRS offset, the first CRS offset different from the second CRS offset, and a third rate matching pattern of the plurality of rate matching patterns corresponds to the first CRS offset and the second CRS offset.

Aspect 14 is the apparatus of any of aspects 1 to 13, where the at least one processor is further configured to: receive, from the base station, a configuration for the RSRP measurement of the CRS for each of the plurality of neighboring cells, where the RSRP measurement is based on the received configuration.

Aspect 15 is the apparatus of any of aspects 1 to 14, where the configuration for the RSRP measurement is received via a serving cell, and the request for the rate matching or skipping the rate matching is transmitted via measurement reporting.

Aspect 16 is the apparatus of any of aspects 1 to 15, where the request for the rate matching or skipping the rate matching is transmitted via a medium access control (MAC) control element (MAC-CE).

Aspect 17 is the apparatus of any of aspects 1 to 16, where the base station is a serving cell associated with the plurality of neighboring cells.

Aspect 18 is the apparatus of any of aspects 1 to 17, further including a transceiver coupled to the at least one processor.

Aspect 19 is a method of wireless communication for implementing any of aspects 1 to 18.

Aspect 20 is an apparatus for wireless communication including means for implementing any of aspects 1 to 18.

Aspect 21 is a computer-readable medium storing computer executable code, where the code when executed by a processor causes the processor to implement any of aspects 1 to 18.

Aspect 22 is an apparatus for wireless communication at a base station including at least one processor coupled to a memory and configured to: receive, from a user equipment (UE), a request for rate matching or skipping rate matching for a cell-specific reference signal (CRS) offset associated with each of a plurality of neighboring cells based on a physical downlink shared channel (PDSCH) demodulation performance of the UE; apply, based on the received request, the rate matching or skipping the rate matching for the CRS offset associated with each of the plurality of neighboring cells; and transmit, to the UE, an indication of the rate matching or skipping the rate matching for the at the CRS offset associated with each of the plurality of neighboring cells.

Aspect 23 is the apparatus of aspect 22, where the indication of the rate matching or skipping the rate matching is transmitted via a medium access control (MAC) control element (MAC-CE), radio resource control (RRC) signaling, or downlink control information (DCI).

Aspect 24 is the apparatus of any of aspects 22 and 23, where the indication of the rate matching or skipping the rate matching is transmitted via a bit field in the DCI associated with a codepoint value, and where the codepoint value of 0 corresponds to skipping the rate matching, the codepoint value of 1 corresponds to the rate matching around a first CRS offset, the codepoint value of 2 corresponds to the rate matching around a second CRS offset, and the codepoint value of 3 corresponds to the rate matching around the first CRS offset and the second CRS offset.

Aspect 25 is the apparatus of any of aspects 22 to 24, where the at least one processor is further configured to: initiate a timer when the request for the rate matching or skipping the rate matching is received, where the rate matching or skipping the rate matching is applied once the timer is initiated; and stop applying the rate matching or skipping the rate matching when the timer expires.

Aspect 26 is the apparatus of any of aspects 22 to 25, where the UE and all of the plurality of neighboring cells are associated with a same radio technology, and a reference signal received power (RSRP) measurement of the CRS for each of the plurality of neighboring cells corresponds to an intra-cell measurement.

Aspect 27 is the apparatus of any of aspects 22 to 26, where the UE and all the plurality of neighboring cells are associated with a different radio technology, and a reference signal received power (RSRP) measurement of the CRS for each of the plurality of neighboring cells corresponds to an inter-radio access technology (RAT) measurement.

Aspect 28 is the apparatus of any of aspects 22 to 27, where the PDSCH demodulation performance of the UE is based on a difference between a signal power of the CRS for one of the plurality of neighboring cells and a signal power of the PDSCH of the UE.

Aspect 29 is the apparatus of any of aspects 22 to 28, where the PDSCH demodulation performance of the UE is based on an interference mitigation of the CRS for each of the plurality of neighboring cells.

Aspect 30 is the apparatus of any of aspects 22 to 29, where the rate matching for the CRS offset associated with each of the plurality of neighboring cells corresponds to a plurality of rate matching patterns, and skipping the rate matching for the CRS offset associated with each of the plurality of neighboring cells corresponds to no rate matching pattern.

Aspect 31 is the apparatus of any of aspects 22 to 30, where a first rate matching pattern of the plurality of rate matching patterns corresponds to a first CRS offset, a second rate matching pattern of the plurality of rate matching patterns corresponds to a second CRS offset, the first CRS offset being different from the second CRS offset, and a third rate matching pattern of the plurality of rate matching patterns corresponds to the first CRS offset and the second CRS offset.

Aspect 32 is the apparatus of any of aspects 22 to 31, where the at least one processor is further configured to: transmit, to the UE, a configuration for a reference signal received power (RSRP) measurement of the CRS for each of the plurality of neighboring cells.

Aspect 33 is the apparatus of any of aspects 22 to 32, where the configuration for the RSRP measurement is transmitted via a serving cell, and the request for the rate matching or skipping the rate matching is received via measurement reporting.

Aspect 34 is the apparatus of any of aspects 22 to 33, where the request for the rate matching or skipping the rate matching is received via a medium access control (MAC) control element (MAC-CE).

Aspect 35 is the apparatus of any of aspects 22 to 34, where the base station is a serving cell associated with the plurality of neighboring cells.

Aspect 36 is the apparatus of any of aspects 22 to 35, further including a transceiver coupled to the at least one processor.

Aspect 37 is a method of wireless communication for implementing any of aspects 22 to 36.

Aspect 38 is an apparatus for wireless communication including means for implementing any of aspects 22 to 36.

Aspect 39 is a computer-readable medium storing computer executable code, where the code when executed by a processor causes the processor to implement any of aspects 22 to 36.

What is claimed is:

1. An apparatus for wireless communication, comprising:
a memory; and
at least one processor coupled to the memory, wherein the at least one processor is configured to:
  measure a reference signal received power (RSRP) of a cell-specific reference signal (CRS) for each of a plurality of neighboring cells;
  calculate an interference strength of each of the plurality of neighboring cells based on the RSRP measurement of the CRS for each of the plurality of neighboring cells;
  compare, based on the calculated interference strength of each of the plurality of neighboring cells, a first physical downlink shared channel (PDSCH) demodulation performance of the apparatus with a second PDSCH demodulation performance of the apparatus, wherein the first PDSCH demodulation performance is based on rate matching for a CRS offset associated with each of the plurality of neighboring cells, and wherein the second PDSCH demodulation performance is based on skipping the rate matching for the CRS offset associated with each of the plurality of neighboring cells; and
  transmit, based on the comparison, a request to a base station, wherein the request is for the rate matching or skipping the rate matching for the CRS offset associated with each of the plurality of neighboring cells.

2. The apparatus of claim 1, wherein the at least one processor is further configured to:
receive, from the base station based on the request, an indication of the rate matching or skipping the rate matching for the CRS offset associated with each of the plurality of neighboring cells.

3. The apparatus of claim 2, wherein, to receive the indication, the at least one processor is configured to receive the indication in a medium access control (MAC) control element (MAC-CE), radio resource control (RRC) signaling, or downlink control information (DCI).

4. The apparatus of claim 3, wherein the indication comprises a bit field in the DCI associated with a codepoint value, and wherein the codepoint value of 0 corresponds to skipping the rate matching, the codepoint value of 1 corresponds to the rate matching around a first CRS offset, the codepoint value of 2 corresponds to the rate matching around a second CRS offset, and the codepoint value of 3 corresponds to the rate matching around the first CRS offset and the second CRS offset.

5. The apparatus of claim 2, wherein the indication is based on a timer at the base station.

6. The apparatus of claim 1, wherein the RSRP measurement of the CRS for each of the plurality of neighboring cells is a CRS RSRP measurement.

7. The apparatus of claim 1, wherein the at least one processor is configured to operate with a same radio technology as all of the plurality of neighboring cells, and the RSRP measurement of the CRS for each of the plurality of neighboring cells corresponds to an intra-cell measurement.

8. The apparatus of claim 1, wherein the at least one processor is configured to operate with a different radio technology than the plurality of neighboring cells, and the RSRP measurement of the CRS for each of the plurality of neighboring cells corresponds to an inter-radio access technology (RAT) measurement.

9. The apparatus of claim 1, wherein the comparison is based on a difference between a first received signal power of the CRS for one of the plurality of neighboring cells and a second received signal power of a PDSCH.

10. The apparatus of claim 1, wherein the comparison is based on an interference mitigation of the CRS for each of the plurality of neighboring cells.

11. The apparatus of claim 1, wherein the at least one processor is further configured to:
determine whether to request the rate matching or skipping the rate matching for the CRS offset associated with each of the plurality of neighboring cells based on the comparison, wherein the request is transmitted based on the determination.

12. The apparatus of claim 11, wherein the rate matching for the CRS offset associated with each of the plurality of neighboring cells corresponds to a plurality of rate matching patterns, and skipping the rate matching for the CRS offset associated with each of the plurality of neighboring cells corresponds to no rate matching pattern.

13. The apparatus of claim 12, wherein a first rate matching pattern of the plurality of rate matching patterns corresponds to a first CRS offset, a second rate matching pattern of the plurality of rate matching patterns corresponds to a second CRS offset, the first CRS offset different from the second CRS offset, and a third rate matching pattern of the plurality of rate matching patterns corresponds to the first CRS offset and the second CRS offset.

14. The apparatus of claim 1, wherein the at least one processor is further configured to:
receive, from the base station, a configuration for the RSRP measurement of the CRS for each of the plurality of neighboring cells;
wherein the RSRP measurement is based on the configuration.

15. The apparatus of claim 14, wherein the configuration for the RSRP measurement is from a serving cell, and wherein, to transmit the request, the at least one processor is configured to transmit the request via measurement reporting.

16. The apparatus of claim 14, wherein, to transmit the request, the at least one processor is configured to transmit the request via a medium access control (MAC) control element (MAC-CE).

17. The apparatus of claim 1, wherein the base station is a serving cell associated with the plurality of neighboring cells.

18. A method of wireless communication at a user equipment (UE) performed by an apparatus, comprising:
measuring a reference signal received power (RSRP) of a cell-specific reference signal (CRS) for each of a plurality of neighboring cells;
calculating an interference strength of each of the plurality of neighboring cells based on the RSRP measurement of the CRS for each of the plurality of neighboring cells;
comparing, based on the calculated interference strength of each of the plurality of neighboring cells, a first physical downlink shared channel (PDSCH) demodulation performance of the apparatus with a second PDSCH demodulation performance of the apparatus, wherein the first PDSCH demodulation performance is based on rate matching for a CRS offset associated with each of the plurality of neighboring cells, and wherein the second PDSCH demodulation performance is based on skipping the rate matching for the CRS offset associated with each of the plurality of neighboring cells; and
transmitting, based on the comparison, a request to a base station, wherein the request is for the rate matching or skipping the rate matching for the CRS offset associated with each of the plurality of neighboring cells.

19. An apparatus for wireless communication, comprising:
a memory; and
at least one processor coupled to the memory, wherein the at least one processor is configured to:
receive, from a user equipment (UE), a request for rate matching or skipping rate matching for a cell-specific reference signal (CRS) offset associated with each of a plurality of neighboring cells based on a comparison of a first physical downlink shared channel (PDSCH) demodulation performance of the UE with a second PDSCH demodulation performance of the apparatus, wherein the first PDSCH demodulation performance is based on rate matching for the CRS, and wherein the second PDSCH demodulation performance is based on skipping the rate matching for the CRS for each of the plurality of neighboring cells;
apply, based on the received request, the rate matching or skipping the rate matching for the CRS offset associated with each of the plurality of neighboring cells; and
transmit, to the UE, an indication of the rate matching or skipping the rate matching for the at the CRS offset associated with each of the plurality of neighboring cells.

20. The apparatus of claim 19, wherein to transmit the indication, the at least one processor is configured to transmit the indication of the rate matching or skipping the rate matching is in a medium access control (MAC) control element (MAC-CE), radio resource control (RRC) signaling, or downlink control information (DCI).

21. The apparatus of claim 20, wherein the indication is comprised in a bit field in the DCI associated with a codepoint value, and wherein the codepoint value of 0 corresponds to skipping the rate matching, the codepoint value of 1 corresponds to the rate matching around a first CRS offset, the codepoint value of 2 corresponds to the rate matching around a second CRS offset, and the codepoint value of 3 corresponds to the rate matching around the first CRS offset and the second CRS offset.

22. The apparatus of claim 19, wherein the at least one processor is further configured to:
initiate a timer when the request for the rate matching or skipping the rate matching is received, wherein the rate matching or skipping the rate matching is applied once the timer is initiated; and stop applying the rate matching or skipping the rate matching when the timer expires.

23. The apparatus of claim 19, wherein the UE and all of the plurality of neighboring cells are associated with a same radio technology, and a reference signal received power (RSRP) measurement of the CRS for each of the plurality of neighboring cells corresponds to an intra-cell measurement.

24. The apparatus of claim 19, wherein the UE is associated with a different radio technology than the plurality of neighboring cells, and a reference signal received power (RSRP) measurement of the CRS for each of the plurality of neighboring cells corresponds to an inter-radio access technology (RAT) measurement.

25. The apparatus of claim 19, wherein the first PDSCH demodulation performance and the second PDSCH demodulation performance are based on a difference between a first signal power of the CRS for one of the plurality of neighboring cells and a second signal power of the PDSCH of the UE.

26. The apparatus of claim 19, wherein the comparison is based on an interference mitigation of the CRS for each of the plurality of neighboring cells.

27. The apparatus of claim 19, wherein the rate matching for the CRS offset associated with each of the plurality of neighboring cells corresponds to a plurality of rate matching patterns, and skipping the rate matching for the CRS offset associated with each of the plurality of neighboring cells corresponds to no rate matching pattern,
  wherein a first rate matching pattern of the plurality of rate matching patterns corresponds to a first CRS offset, a second rate matching pattern of the plurality of rate matching patterns corresponds to a second CRS offset, the first CRS offset being different from the second CRS offset, and a third rate matching pattern of the plurality of rate matching patterns corresponds to the first CRS offset and the second CRS offset.

28. The apparatus of claim 19, wherein the at least one processor is further configured to:
  transmit, to the UE, a configuration for a reference signal received power (RSRP) measurement of the CRS for each of the plurality of neighboring cells;
  wherein the configuration for the RSRP measurement is transmitted via a serving cell, and the request for the rate matching or skipping the rate matching is received via measurement reporting, or
  wherein the request for the rate matching or skipping the rate matching is received via a medium access control (MAC) control element (MAC-CE).

29. The apparatus of claim 19, wherein the apparatus is associated with a serving cell associated with the plurality of neighboring cells.

30. A method of wireless communication performed by an apparatus, comprising:
  receiving, from a user equipment (UE), a request for rate matching or skipping rate matching for a cell-specific reference signal (CRS) offset associated with each of a plurality of neighboring cells based on a comparison of a first physical downlink shared channel (PDSCH) demodulation performance of the UE with a second PDSCH demodulation performance of the apparatus, wherein the first PDSCH demodulation performance is based on rate matching for the CRS, and wherein the second PDSCH demodulation performance is based on skipping the rate matching for the CRS for each of the plurality of neighboring cells;
  applying, based on the received request, the rate matching or skipping the rate matching for the CRS offset associated with each of the plurality of neighboring cells; and
  transmitting, to the UE, an indication of the rate matching or skipping the rate matching for the at the CRS offset associated with each of the plurality of neighboring cells.

* * * * *